(12) United States Patent
Koike

(10) Patent No.: US 6,519,165 B2
(45) Date of Patent: Feb. 11, 2003

(54) DC-TO-DC CONVERTER

(75) Inventor: Kengo Koike, Kamifukuoka (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 09/996,841

(22) Filed: Nov. 29, 2001

(65) Prior Publication Data

US 2002/0067629 A1 Jun. 6, 2002

(30) Foreign Application Priority Data

Dec. 4, 2000 (JP) ........................................ 2000-369198

(51) Int. Cl.[7] ............................................. H02M 3/335
(52) U.S. Cl. .............................. 363/21.12; 363/21.15; 363/97
(58) Field of Search ............................... 363/20, 21.12, 363/21.13, 21.15, 21.18, 95, 97, 131

(56) References Cited

U.S. PATENT DOCUMENTS

| | | | | |
|---|---|---|---|---|
| 5,268,832 A | * | 12/1993 | Kandatsu | .................. 363/95 |
| 5,331,534 A | * | 7/1994 | Suzuki et al. | ................. 363/20 |
| 5,668,713 A | * | 9/1997 | Eguchi et al. | ................. 363/95 |
| 5,991,172 A | * | 11/1999 | Jovanovic et al. | ............. 363/21 |
| 6,188,585 B1 | * | 2/2001 | Ikeda et al. | ..................... 363/17 |
| 6,445,598 B1 | * | 9/2002 | Yamada | ................... 363/21.12 |

FOREIGN PATENT DOCUMENTS

JP      2000023458 A     1/2000

* cited by examiner

*Primary Examiner*—Adolf Denske Berhane
(74) *Attorney, Agent, or Firm*—Woodcock & Washburn LLP

(57) ABSTRACT

A transformer has a primary winding connected between a pair of d.c. input terminals via an on-off switch, and a secondary winding connected between a pair of d.c. output terminals via a rectifying and smoothing circuit. The output voltage applied from the rectifying and smoothing circuit to the load is held constant by switching the input voltage through feedback control. For intermittently operating the switch under light load, a sawtooth generator circuit is provided which provides a sawtooth voltage having a frequency less than that of the on-off operation of the switch. The sawtooth voltage is compared with a voltage indicative of the magnitude of a current flowing through the switch. The result of this comparison is utilized for modifying the delivery of switching pulses to the switch.

14 Claims, 17 Drawing Sheets

DC-TO-DC CONVERTER

BACKGROUND OF THE INVENTION

This invention relates generally to d.c.-to-d.c. converters which convert one direct-current voltage into another, and particularly to a d.c.-to-d.c. converter for providing a constant output voltage through feedback control.

The d.c.-to-d.c. converter of the kind under consideration comprises a transformer having a primary winding connected across a d.c. power supply via an on/off switch, a rectifying and smoothing circuit connected to the secondary winding of the transformer, an output voltage detector circuit, another detector circuit for detecting the current flowing through the serial connection of the transformer primary and the switch, and a switch control circuit for on-off control of the switch according to the outputs from the output voltage detector circuit and switch current detector circuit.

One of the problems encountered with this type of d.c.-to-d.c. converter was the relationship between the switching frequency of the d.c. voltage and the load connected across the transformer secondary via the rectifying and smoothing circuit. The proportion of power loss at the switch to the power requirement of the load increased when the switching frequency at the time of a drop in power consumption of the load was left as high as, or even higher than, under normal power consumption.

Japanese Unexamined Patent Publication No. 2000-23458 represents a solution to this poor efficiency of the prior art d.c.-to-d.c. converter under light load. The solution is such that the converter is operated at intervals under light load. Switching loss is lessened through reduction of the switching frequency at the sacrifice of stability in output voltage.

The solution has proved not totally satisfactory, however. With the converter put to intermittent operation, the conducting period of the switch inordinately increased at the beginning of each operating period in order to compensate for a drop in output voltage during the preceding nonoperating period. The prolonged closure of the switch invited large current flow through the switch and the transformer. The result, to the discomfort of the user, was the production of magnetostrictive noise by the transformer.

The noted prior art converter relies for its intermittent operation upon on-off control of the voltage feedback by pulses of rectangular shape. These pulses are not exactly rectangular in shape but modified to suppress, to some extent, the magnetostrictive noise, or ringing, of the transformer through restriction of an increase in current flow through the switch during intermittent operation. However, no truly satisfactory suppression of transformer ringing has proved possible in this manner unless, impractically, the feedback control circuit is designed with full consideration to such factors as fluctuations in, and temperature dependencies of, the performance characteristics of its individual components. It is also a disadvantage that an additional pulse generator has had to be provided on the output side of the transformer for intermittent operation of the converter.

SUMMARY OF THE INVENTION

The present invention aims, in a d.c.-to-d.c. converter of the kind under consideration, at reduction of the magnetostrictive noise of the transformer or other inductance means to an absolute minimum without the inconveniences experienced heretofore.

Stated in brief, the present invention concerns a d.c.-to-d.c. converter of the general construction comprising a switch connected between a pair of converter input terminals via inductance means such as a transformer, a rectifying and smoothing circuit connected to the inductance means for providing a d.c. output voltage to be applied to a load, an output voltage detector circuit for detecting the output voltage, and a switch current detector circuit for putting out a voltage indicative of the magnitude of a current flowing through the switch.

More specifically, the invention provides, in the d.c.-to-d.c. converter of the type defined above, a periodic wave generator circuit for generating a sawtooth or like periodic wave voltage. In any event the periodic wave voltage should be in the form of a series of alternations of a rise and a fall, with a period that is a plurality of times longer than the period of switching pulses of variable durations applied to the switch. Further the periodic voltage should cross the output voltage of the switch current detector circuit during its rises and falls. A comparator has an input connected to the switch current detector circuit, and another input connected to the periodic wave generator circuit, for providing an output that changes from one state to another depending upon the relative magnitudes of the switch current detector output voltage and the periodic voltage. Also included is a switch control circuit having an output connected to the switch for delivering the switching pulses thereto, an input connected to the output voltage detector circuit for controlling the durations of the switching pulses according to the converter output voltage so as to keep the same constant, and another input connected to the comparator for permitting or preventing the delivery of the switching pulses to the switch depending upon the binary output from the comparator.

It is to be appreciated that the periodic wave generator circuit functions both for the desired intermittent operation of the converter under light load and for current control through the transformer or like inductance means. Thus making the overall converter circuitry materially simpler than heretofore, the periodic wave generator circuit nevertheless attains the seemingly self-contradictory objectives of intermittent converter operation and the suppression of magnetostrictive noise in the course of such operation.

The above and other objects, features and advantages of this invention will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
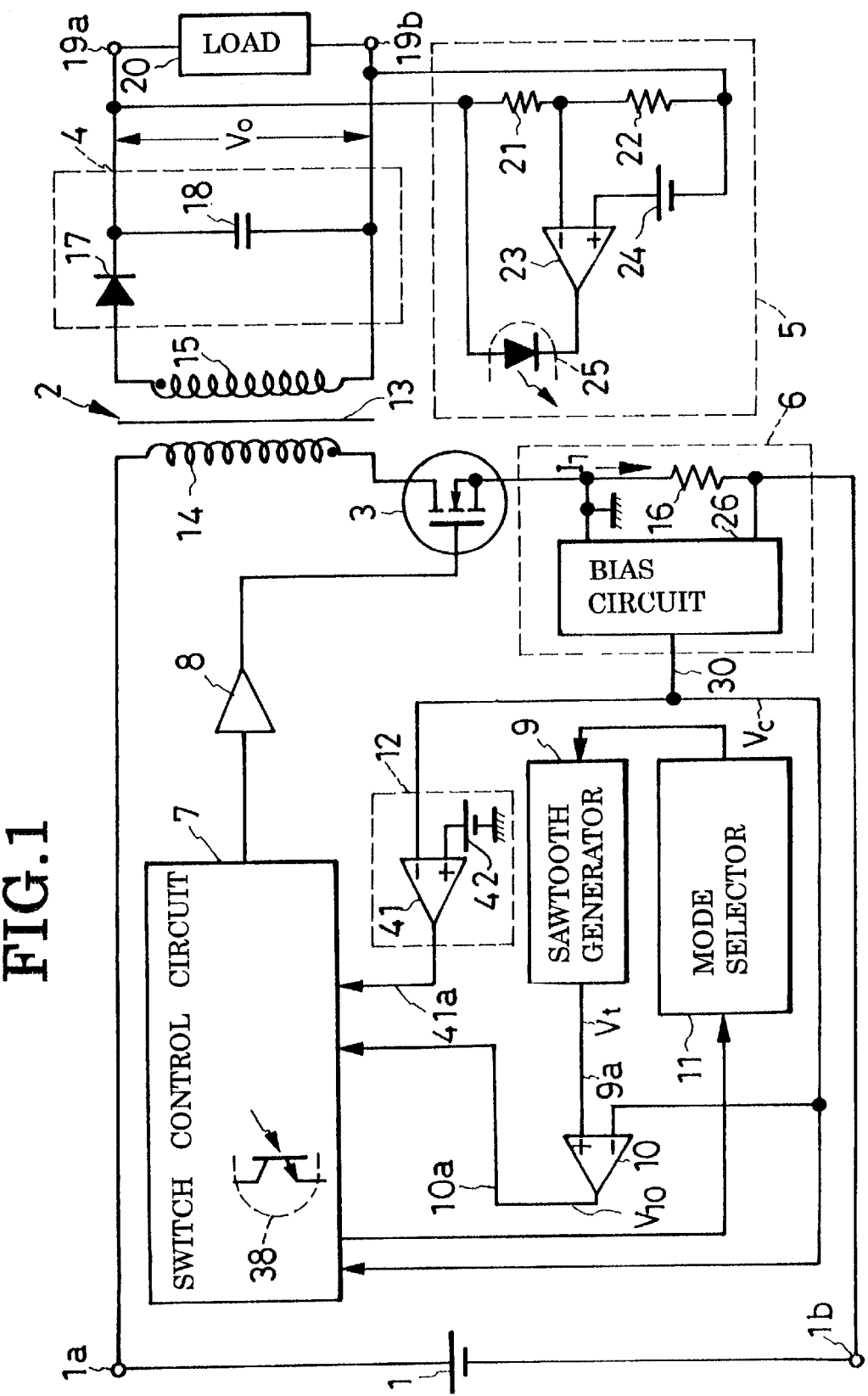
FIG. 1 is a schematic electrical diagram, partly in block form, of a first preferred form of d.c.-to-d.c. converter embodying the principles of this invention.

The present invention is believed to be best embodied in the fly-back d.c.-to-d.c. converter of FIG. 1. The converter has a pair of input terminals 1a and 1b, with a d.c. power supply 1 shown connected therebetween. Some primary components of the converter 1 are:

1. An inductance means shown as a transformer 2 having a magnetic core 13, a primary winding 14 coiled around the core with the opposite extremities thereof connected to the pair of input terminals 1a and 1b, and a secondary winding 15 also coiled around the core 13 with the opposite extremities thereof connected to a pair of output terminals 19a and 19b, between which output terminals is shown connected a load 20.
2. An on-off switch 3 shown as a field-effect transistor connected between the input terminal 1b and the transformer primary 14.
3. A rectifying and smoothing circuit 4 connected across the transformer secondary 15.
4. An output voltage detector circuit 5 connected to the output side of the rectifying and smoothing circuit 4 for detecting the output voltage being applied to the load 20.
5. A current detector circuit 6 for detecting the current flowing through the switch 3 and providing a voltage output indicative of the switch current magnitude.
6. A switch control circuit 7 for providing switching pulses of variable, controlled durations for application to the control terminal (gate of the FET in this case) of the switch 3 via a switch driver circuit 8 thereby to turn the switch on and off.
7. A sawtooth generator circuit 9, referred to as the periodic wave generator circuit in the foregoing summary of the invention, for providing a sawtooth voltage.
8. A comparator 10 for limiting the conducting periods of the switch 3 by comparing the sawtooth voltage from the generator circuit 9 and the output voltage of the current detector circuit 6.
9. A mode selector circuit 11 for setting the converter in either Normal Mode or Standby mode according to whether the converter is under normal or light load.
10. An overcurrent detector circuit 12 connected to the switch current detector circuit 6 for detecting an overcurrent flowing through the switch 3.

The transformer primary 14 with its leakage inductance forms a serial circuit with the switch 3 and a resistor 16 of the current detector circuit 6, this serial circuit being connected between the pair of input terminals 1a and 1b. Electromagnetically coupled to the transformer primary 14, the transformer secondary 15 is oriented opposite to the primary in polarity, as indicated by the dots in FIG. 1. Thus is energy stored on the transformer 2 during the conducting periods of the switch 3, and released during its nonconducting periods.

The rectifying and smoothing circuit 4 is shown as a combination of a rectifying diode 17 and a smoothing capacitor 18. The smoothing capacitor 18 is connected in parallel with the transformer secondary 18 via the rectifying diode 17. The rectifying diode 17 is so oriented with respect to the transformer windings 14 and 15 as to be conductive during the nonconducting periods of the switch 3. The smoothing capacitor 18 is also connected between the pair of output terminals 19a and 19b.

The output voltage detector circuit 5 includes two voltage-dividing resistors 21 and 22 connected between the pair of output terminals 19a and 19b for detecting the converter output voltage. The junction between these resistors 21 and 22 is connected one input of a differential amplifier 23, the other input of which is connected to a reference voltage source 24. Connected between the converter output terminal 19a and the output of the differential amplifier 23, a light-emitting diode 25 provides an optical output having intensity proportional to the converter output voltage.

For detecting the current $I_1$ flowing through the switch 3 and transformer primary 14, the current detector circuit 6 comprises the aforesaid current-detecting resistor 16 connected in series with the switch 3, and a bias circuit 26 connected in parallel with the resistor. As illustrated in more detail in FIG. 2, the bias circuit 26 is a serial connection of a biasing d.c. power supply 27 and two voltage-dividing resistors 28 and 29, all connected in parallel with the current-detecting resistor 16. The junction between the resistors 28 and 29 is connected to an output conductor 30. The current-detecting resistor 16 has one extremity thereof grounded, besides being connected to the switch 3, and the other extremity connected to the input terminal 1b, which is a negative one. The biasing power supply 27 has its negative terminal also grounded.

Such being the construction of the current detector circuit 6, its output voltage, indicative of the magnitude of the current flowing through the switch 3, is defined as follows:

$$V_c = V_b - (V_a + V_b) R_1 / (R_1 + R_2)$$

where

V$_c$=the voltage between the output conductor 30 of the current detector circuit 6 and the ground, V$_a$=the voltage across the current-detecting resistor 16, V$_b$=the voltage of the power supply 27, R$_1$=the resistance value of the resistor 28, R$_2$=the resistance value of the resistor 29.

It is understood that the bias voltage V$_b$ is set higher than the voltage V$_a$ across the current-detecting resistor 16 at the peak magnitude of the current I$_1$ flowing through the switch 3. Consequently, as indicated at (C) in FIG. 4 and (C) in FIG. 5, the output voltage V$_c$ of the current detector circuit 6 maximizes at the voltage V$_{bb}$, the result of division of the bias voltage V$_b$ by the resistors R$_1$ and R$_2$ when the voltage V$_a$ across the current-detecting resistor 16 is zero, and varies in a range not more than the voltage V$_{bb}$. A comparison of (B) and (C) in both FIGS. 4 and 5 will show that, essentially, the waveform of the current I$_1$ is inverted, and biased with the voltage V$_b$, to provide the waveform of the current detector circuit output voltage V$_c$. Incidentally, since the transformer primary 14 is inductive, the current I$_1$ flowing therethrough rises gradually during each conducting period of the switch 3, providing a triangular waveform as at (B) in FIGS. 4 and 5.

With reference back to FIG. 1 the switch control circuit 7 has inputs connected to all of the current detector circuit 6, the comparator 10, and the overcurrent detector circuit 12, besides being optically coupled to the LED 25 of the output voltage detector circuit 5. In response to all these inputs the switch control circuit 7 creates switch control pulses for application to the gate of the FET switch 3 via the driver circuit 8.

Figure 2:
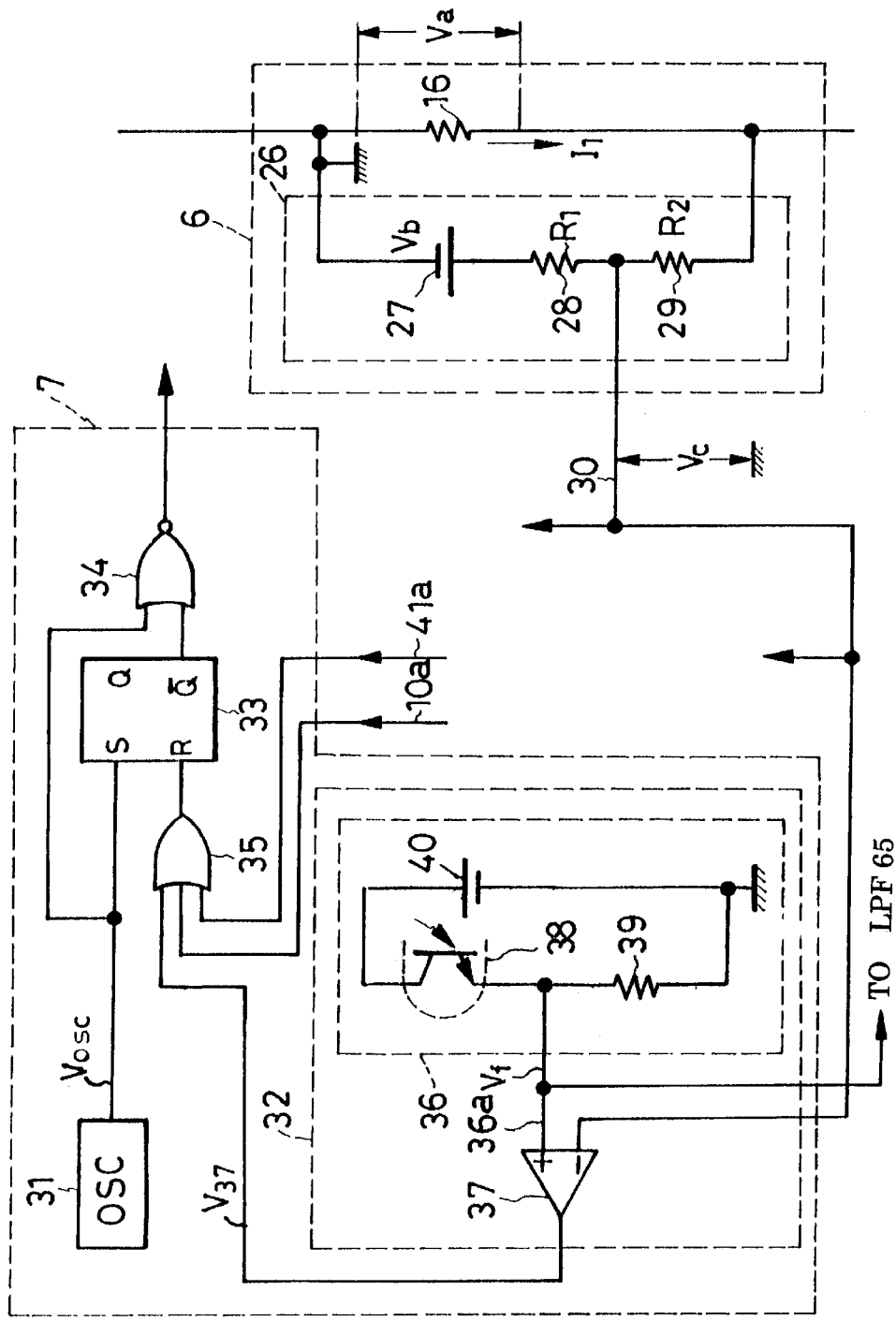
FIG. 2 is a schematic electrical diagram showing in more detail the switch current detector circuit and switch control circuit of the FIG. 1 converter.

As illustrated in detail in FIG. 2, the switch control circuit 7 broadly comprises a pulse generator 31, a conducting period determination circuit 32, an RS flip-flop 33, with priority to resetting, a NOR gate 34, and an OR gate 35. The pulse generator 31 generates a series of short-duration pulses, shown at (A) in FIG. 4, with a recurrence rate in the range of, say, 30–300 kilohertz. The period T$_1$ of the pulse output V$_{osc}$ from the pulse generator 31 is constant in this particular embodiment of the invention, and the switch 3 is turned on and off at the frequency determined by that of the pulse generator output V$_{osc}$. As required or desired, however, there may be provided a source of switching pulses having a repetition frequency variable depending upon the power requirement of the load 20.

As the name implies, the conducting period determination circuit 32 determines the conducting periods of the switch 3. Included are a voltage feedback circuit 36 and a comparator 37. The voltage feedback circuit 36 produces a voltage feedback signal V$_f$ in proportion with the converter output voltage V$_o$. The comparator 37 has a positive input connected to the voltage feedback circuit 36, and a negative input connected to the output conductor 30 of the current detector circuit 6.

The voltage feedback circuit 36 includes a phototransistor 38 optically coupled to the LED 25, FIG. 1, of the output voltage detector circuit 5. The resistance offered by the phototransistor 38 changes in inverse proportion to the intensity of the optical output from the LED 25. The phototransistor 38 has its emitter grounded via a resistor 39, and its collector connected to a power supply 40, so that the feedback voltage V$_f$ across the resistor 39 is proportional to the converter output voltage V$_o$.

Figure 4:
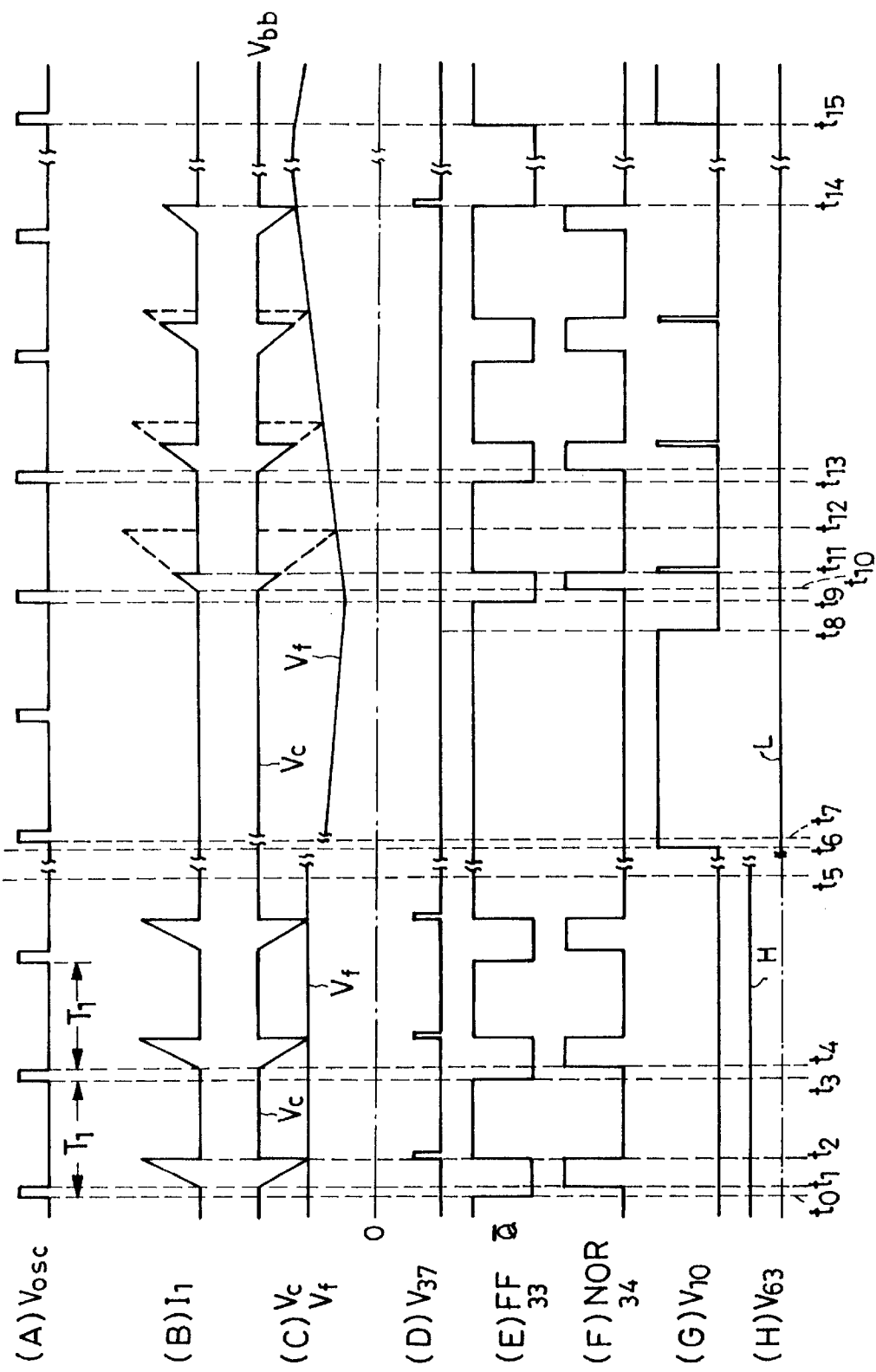
FIG. 4, consisting of (A) through (H), is a waveform diagram showing, in proper time relationship to one another, the waveforms appearing in various parts of FIGS. 1–3.

Comparing the output voltage V$_c$ from the switch current detector circuit 6 and the feedback voltage V$_f$, both indicated at (C) in FIG. 4, the comparator 37 puts out a short-duration pulse, (D) in FIG. 4, each time the current detector output voltage V$_c$ drops to the same level as the feedback voltage V$_f$. The moments of appearance of these short-duration pulses are the moments of termination of the conducting periods of the switch 3.

The RS flip-flop 33 of the switch control circuit 7 has its set input S connected to the pulse generator 31, and its reset input R connected to the comparator 37 of the conducting period determination circuit 32, to the output line 10a of the comparator 10, FIG. 1, and to the output line 41a of the comparator 41, FIG. 1, of the overcurrent detector circuit 12, all via the three-input OR gate 35. The inverting output $\overline{Q}$ of the flip-flop 33 is connected to one input of the NOR gate 34, which has its other input connected to the pulse generator 31, and its output connected to the gate of the FET switch 3, FIG. 1, via the switch driver circuit 8.

Triggered by the leading edge, as at t$_0$ in FIG. 4, of each pulse generator output pulse V$_{osc}$ shown at (A) in this figure, the flip-flop 33 has its inverting output gone low at that moment. Then, reset as at t$_2$ by the leading edge of the subsequent output pulse V$_{37}$ from the comparator 37 shown at (D) in FIG. 4, the flip-flop 33 has its inverting output gone high. The same cycle of operation occurs at and after t$_3$ in FIG. 4, so that the flip-flop 33 provides the output depicted at (E) in FIG. 4. Receiving this flip-flop output, and that from the pulse generator 31 too, the NOR gate 34 puts out the switch control pulses as at (F) in FIG. 4, for application to the gate of the FET switch 3 via the switch driver circuit 8. It will be noted that the NOR gate 34 is high as from t$_1$ to t$_2$, causing conduction through the switch 3 during that time interval.

The comparator 41, FIG. 1, of the overcurrent detector circuit 12 has its negative input connected to the output line 30 of the switch current detector circuit 6, and its positive output to a reference voltage source 42. The reference voltage from this source 42 is set lower than the level of the switch current detector output voltage V$_c$, (C) in FIG. 5, under normal power requirement of the load 20. Consequently, in the event of an increase in the peak value of the switch current I$_1$ as a result of an overloading due to short-circuiting, for instance, the comparator 41 will put out a pulse when the switch current detector output voltage V$_c$ rises to the reference voltage. This pulse will be applied via the OR gate 35, FIG. 2, to the reset input R of the flip-flop 33 thereby causing its inverting output to go high. The resulting output from the NOR gate 34 will be low and so cause nonconduction through the switch 3 for its protection from destruction due to overcurrent.

Figure 5:
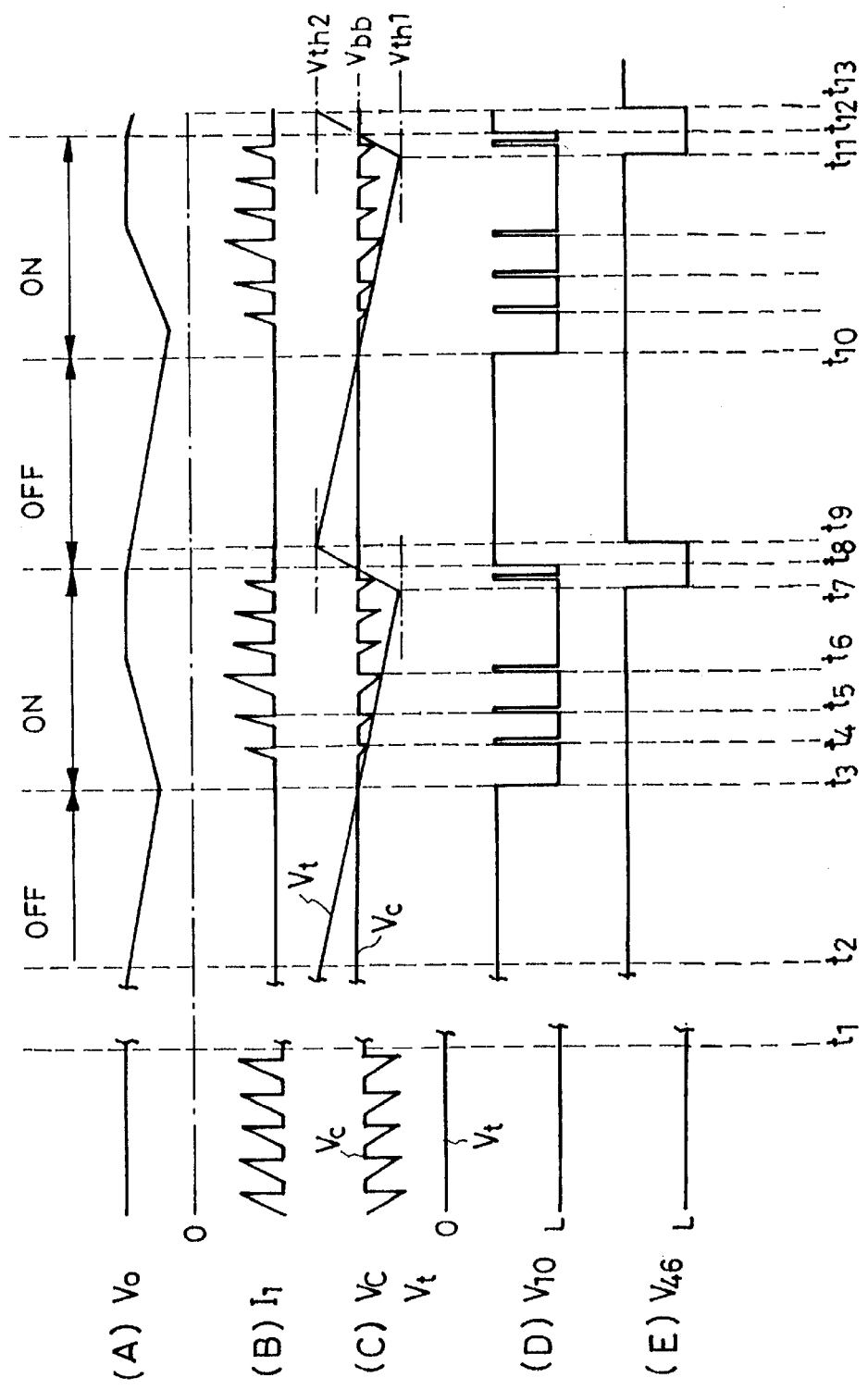
FIG. 5, consisting of (A) through (E), is a waveform diagram showing, in proper time relationship to one another, the waveforms appearing in various parts of FIGS. 1 and 3.

The sawtooth generator circuit 9, FIG. 1, is designed to provide a sawtooth voltage V$_t$ shown at (C) in FIG. 5. Having a period that is several times longer than that of the switching pulses impressed to the switch 3 for its on-off operation, the sawtooth voltage V$_t$ has a waveform in the form of a series of alternations of a rise, as from t$_7$ to t$_9$ in FIG. 5, and a fall as from t$_9$ to t$_{11}$ in the same figure. It will also be observed from this figure that the sawtooth voltage V$_t$ crosses the voltage V$_{bb}$ during its rises and falls and so have both portions higher, and those lower, than that voltage. This voltage V$_{bb}$ as aforesaid is the result of division of the bias voltage V$_b$ by the resistors R$_1$ and R$_2$, FIG. 2, when the voltage V$_a$ across the current-detecting resistor 16 is zero.

Figure 3:
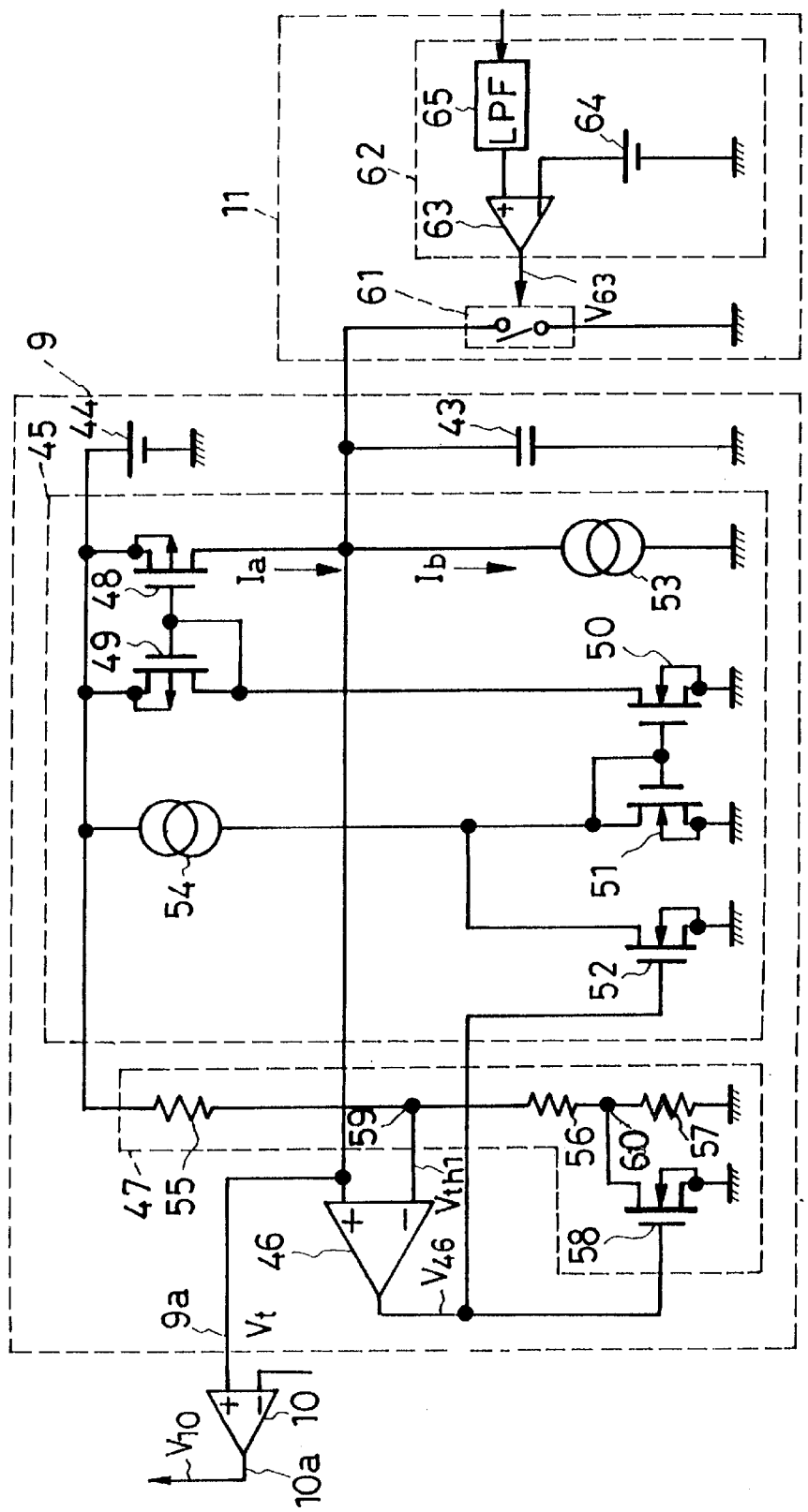
FIG. 3 is a schematic electrical diagram showing in more detail the sawtooth generator circuit and mode selector circuit of the FIG. 1 converter.

FIG. 3 is a detailed illustration of the sawtooth generator circuit 9 together with the mode selector circuit 11. The sawtooth generator circuit 9 may be subdivided into a capacitor 43, a d.c. power supply 44, a charge/discharge circuit 45, a comparator 46, and a variable reference voltage source 47. The capacitor 43 is grounded on one hand and, on the other hand, connected to both the charge/discharge circuit 45 and the positive input of the comparator 46.

The charge/discharge circuit 45 of the sawtooth generator circuit 9 comprises five switching devices consisting of two p-channel field-effect transistors 48 and 49 and three n-channel field-effect transistors 50–52, and two constant current supply circuits 53 and 54. The four FETs 48–51 constitute in combination a current mirror circuit. The p-channel FET 48 is connected between power supply 44 and capacitor 43. The first constant current supply circuit 53 is connected in parallel with the capacitor 43. Therefore, charged by the difference, $I_a-I_b$, between the current $I_a$ flowing through the FET 48 and the current $I_b$ flowing through the constant current supply circuit 53, the capacitor 43 provides the positive-going parts, as from $t_7$ to $t_9$ in FIG. 5, of the sawtooth voltage $V_t$ shown at (C) in that figure.

For on-off control of the FET 48 constituting a charging circuit, the p-channel FET 49 has its source connected to the power supply 44, its gate to the gate of the FET 48, and its drain to the ground via the n-channel FET 50. The n-channel FET 50 has its drain connected to the gate of the p-channel FET 48 as well. The n-channel FET 51 has its drain connected to the power supply 44 via the second constant current supply circuit 54, and its gate to the gate of the FET 50. The FET 51 has its drain and gate interconnected directly. Connected in parallel with the FET 51, the n-channel FET 52 has its gate connected to the output of the comparator 46.

The variable reference voltage source 47 of the sawtooth generator circuit 9 comprises a serial circuit of three resistors 55–57, and an n-channel transistor 58. The serial resistor circuit is connected between power supply 44 and ground. The junction 59 between the resistors 55 and 56 is connected to the negative input of the comparator 45, and the junction 60 between the resistors 56 and 57 to the drain of the FET 58. The source of the FET 58 is grounded, and its gate connected to the output of the comparator 46. As will be readily apparent, the sawtooth generator circuit 9 need not possess the power supply 44 of its own, being capable of being powered, instead, by the power supply 27, FIG. 2, or by any other power supply.

Employed for on-off control of the sawtooth generator circuit 9 is the mode selector circuit 11 shown also in FIG. 3. The mode selector circuit 11 comprises a mode selector switch 61 to be turned on or off to set the converter in either Normal Mode or Standby Mode, and a load sensor circuit 62 connected to the control input of the mode selector switch for its on-off control according to the power requirement of the load 20. The mode selector switch 61 is connected in parallel with the capacitor 43 of the sawtooth generator circuit 9. The load sensor circuit 62 comprises a comparator 63, a reference voltage source 64, and a low-pass filter 65. The comparator 63 has its negative input connected to the reference voltage source 64, and its positive input to the LPF 65 and thence to the output line 36a, FIG. 2, of the voltage feedback circuit 36.

The reference voltage from the source 64 is less than the voltage of the voltage feedback signal $V_f$, shown at (C) in FIG. 4, under normal load, as from $t_0$ to $t_5$ in that figure, and higher than the mean voltage of the voltage feedback signal $V_f$ under light load, as from $t_7$ to $t_{15}$ in that figure. Thus the comparator 63 goes high, indicating Normal Mode, when the voltage feedback signal $V_f$ is of greater magnitude than the reference voltage from the source 64, and low, indicating Standby Mode, when the voltage feedback signal $V_f$ is of less magnitude than the reference voltage. The mode selector switch 61 is closed by the high output from the comparator 63, and opened by the low.

The illustrated load sensor circuit 62 represents but one of many possible forms it may take in practice. It may even be omitted altogether in the case where the load to be powered by this converter is equipped for switching between normal and small power requirements. That switching means may then be connected to the mode selector switch 61 in substitution for the load sensor circuit 62.

The capacitor 43 of the sawtooth generator circuit 9 is bypassed by the mode selector switch 61 when this switch is closed during normal-load operation. Consequently, the voltage $V_t$ on the sawtooth generator output line 9a is held low or at zero, as before $t_1$ at (C) in FIG. 5. When the mode selector switch 61 is open during light-load operation, on the other hand, the capacitor 43 will be periodically charged and discharged thereby giving rise to the sawtooth voltage $V_t$, as from $t_2$ to $t_{12}$ in FIG. 5. What follows is a more detailed discussion of how this sawtooth voltage $V_t$ is created:

The potential at the junction between the resistors 55 and 56, FIG. 3, of the variable reference voltage source 47 has a first value (first reference voltage) $V_{th1}$ of, say, 0.5 volt when the FET 58 is conductive, and a second value (second reference voltage) $V_{th2}$ of, say, 3.0 volts when the FET is nonconductive. Let it be supposed that, with the progress of discharge from the capacitor 43, the sawtooth voltage $V_t$ being applied to the positive input of the comparator 46 drops to the first reference voltage $V_{th1}$ at $t_7$ in FIG. 5. Thereupon the comparator 46 will go low, as at (E) in FIG. 5, thereby causing nonconduction through the FET 58. The second reference voltage $V_{th2}$ will then be applied to the negative input of the comparator 46, so that the output $V_{46}$ from the comparator will be low from $t_7$ to $t_9$ in FIG. 5.

It will also be observed from FIG. 3 that the FET 52 of the charge/discharge circuit 45 will be nonconductive, either, during this $t_7-t_9$ period; instead, the other FETs 48–51 will all be conductive. Since then the capacitor 43 will be charged through the FET 48, the voltage $V_t$ across this capacitor will rise gradually, as at (C) in FIG. 5, until it reaches the second reference voltage $V_{th2}$ at $t_9$. Thereupon the comparator 46 will go high. As the FET 58 conducts as a result, the first reference voltage $V_{th1}$ will be applied to the negative input of the comparator 46, so that the output $V_{46}$ therefrom will be high from $t_9$ to $t_{11}$, as at (E) in FIG. 5. The FET 52 will be on, and all the other FETs 48–51 off, during this $t_9-t_{11}$ period. The capacitor 43 will therefore be discharged through the constant current supply circuit 53, with the voltage $V_t$ across the capacitor dwindling from $t_9$ to $t_{11}$.

For compulsory reduction of the conducting periods of the switch 3 under light load, the comparator 10, FIGS. 1 and 3, has its positive input connected to the capacitor 43 of the sawtooth generator circuit 9 by way of the line 9a, its negative input to the current detector circuit 6 by way of the line 30, and its output to the reset input R of the flip-flop 33, FIG. 2, of the switch control circuit 7 via the OR gate 35. Thus, comparing the sawtooth voltage $V_t$ on the sawtooth generator output line 9a and the switch current detector output voltage $V_c$ on the current detector output line 30, both voltages $V_t$ and $V_c$ being shown at (C) in FIG. 5, the comparator 10 provides the output $V_{10}$ seen at (D) in FIG. 5. The sawtooth voltage $V_t$ is shown to be zero before $t_1$ in FIG. 5, when the converter is under normal load, so that the output $V_{10}$ from the comparator 10 is low, not taking part in limitation of pulse duration in the switch control circuit After $t_2$ in FIG. 5, when the converter is assumed to be lightly loaded, the sawtooth voltage $V_t$ will cyclically change in magnitude as at (C) in FIG. 5, becoming higher than the switch current detector output voltage $V_c$ as before $t_3$, from $t_8$ to $t_{10}$, and after $t_{12}$. The comparator output $V_{10}$ will be high during these periods, as at (D) in FIG. 5. Reset by these high states of the comparator output $V_{10}$, the flip-flop 33 will not respond to the output pulses of the pulse generator 31. The inverting output of the flip-flop 33 will stay high, as from $t_7$ to $t_9$ at (E) in FIG. 4. The corresponding output from the NOR gate 34 will be low, as at (F) in FIG. 4, holding the switch 3 open.

The comparator output $V_{10}$ will go low at $t_3$ in FIG. 5 when the sawtooth voltage $V_t$ becomes less than the switch current detector output voltage $V_c$. Thereupon, enabled to respond to the output from the pulse generator 31, the flip-flop 33 of the FIG. 2 switch control circuit 7 will be set at $t_9$ in FIG. 4, so that its inverting output will go low as at (E) in this figure. The NOR gate 34 will go high at $t_{10}$, as at (F) in FIG. 4, thereby closing the switch 3, FIG. 1, with the consequent flow of the current $I_1$ therethrough as at (B) in FIG. 4. The switch 3 has been open until $t_8$ in FIG. 4 and $t_3$ in FIG. 5, so that the output voltage $V_o$ has been diminishing as at (A) in FIG. 5, and so has been the voltage feedback signal $V_f$ as at (C) in FIG. 4. Should the switch 3 be held closed until the switch current detector output voltage $V_c$ crosses the voltage feedback signal $V_f$, the current $I_1$ would become excessive in magnitude, as indicated by the broken lines at (B) in FIG. 4, resulting in the production of magnetostrictive noise by the transformer 2.

In order to preclude the likelihood of such noise production, the flip-flop 33 is reset according to the novel concepts of this invention as at $t_4$, $t_5$ and $t_6$ in FIG. 5 when the comparator output voltage $V_{10}$ goes high as the switch current detector output voltage $V_c$ crosses the sawtooth voltage $V_t$. The switch 3 is opened by compulsorily resetting the flip-flop 33 before the current detector output voltage $V_c$ reaches the voltage feedback signal $V_f$.

Since then the sawtooth voltage $V_t$ is dwindling as at (C) in FIG. 5, the peak of the switch current $I_1$ will rise incrementally, as at $t_4$, $t_5$ and $t_6$ at (B) in FIG. 5. This is the "soft starting" of the switch 3 into each conducting period. With such intermittent closure of the switch 3 during the $t_3$–$t_8$ period in FIG. 5, the smoothing capacitor 18, FIG. 1, of the rectifying and smoothing circuit 4 will be charged, and the converter output voltage $V_o$ will rise as at (A) in FIG. 5. The constant-voltage control of the converter will be resumed as at $t_{14}$ in FIG. 4 when the switch current detector output voltage $V_c$ reaches the voltage feedback signal $V_f$ at $t_{14}$, as drawn at (C) in that figure.

The flip-flop 33 will become unresponsive to the output from the pulse generator 31 at $t_8$ in FIG. 5 when the comparator output voltage $V_{10}$ goes high, as at (D) in that figure. Another nonconducting period of the switch 3 sets in. What is shown taking place from $t_3$ to $t_{10}$ in FIG. 5 will repeat itself when the converter is lightly loaded.

Such being the construction and operation of the FIG. 1 converter, the advantages gained by this particular embodiment of the invention may be recapitulated as follows:

1. Comparison between sawtooth voltage $V_t$ and switch current detector output voltage $V_c$ is relied upon both for determination of the conducting and nonconducting periods of the switch 3 and for the "soft starting" of each conducting period of the switch 3. The two objectives are met by relatively simple circuitry, contributing to the cost reduction of d.c.-to-d.c. converters of this kind.
2. The transformer 2 is protected from magnetostrictive noise production as the switch current $I_1$ does not become excessively high in magnitude during an early part of each conducting period of the switch 3.
3. Switchings per unit length of time are reduced when the converter is lightly loaded.
4. The load state on the converter is accurately detected by the load sensor circuit 62 incorporated in the mode selector, so that intermittent converter operation is automatically initiated for higher power efficiency under light load.
5. The output from the switch current detector circuit 6 is utilized by all of the comparator 37, FIG. 2, of the conducting period determination circuit 32, the comparator 10, FIG. 1, for limitation of the conducting periods of the switch 3, and the comparator 41, FIG. 1, of the overcurrent detector circuit 12. Reduction in size and cost of the converter is thus realized. All but the transformer primary 14, power supply 1, phototransistor 38, switch 3, and resistor 16 of the input side of the transformer 2 can be fabricated in the form of an integrated circuit. Since resistors make relatively large areal requirements in integrated circuits, the sharing of the two resistors 28 and 29 of the switch current detector circuit 6 by the three comparators 10, 37 and 41 leads to a substantive curtailment in the area occupied by the resistors.
6. Provided on the input side of the transformer 2, the sawtooth generator circuit 9 can be incorporated into a single integrated circuit with the switch control circuit 7.
7. The sawtooth generator circuit 9, FIG. 3, employs two constant current circuits 53 and 54 and five FETs 48–52 for controlling the charging and discharging of the capacitor 43, resulting in accurate production of the sawtooth voltage $V_t$ for comparison with the switch current detector output voltage $V_c$ and hence in reliable soft-starting of the switch 3 into each conducting period.

Figure 6:
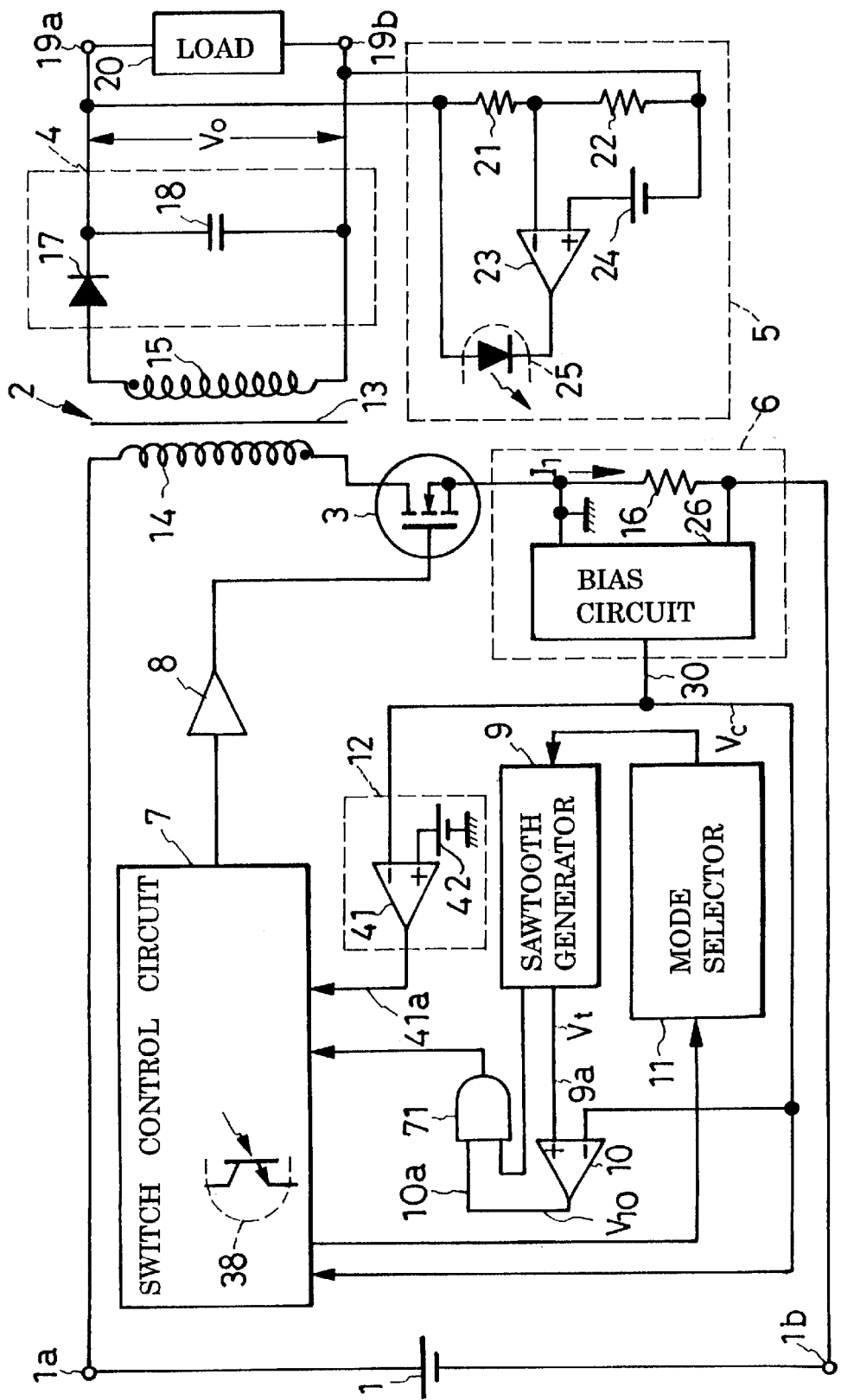
FIG. 6 is a diagram similar to FIG. 1 but showing a second preferred form of d.c.-to-d.c. converter according to the invention.
Figure 7:
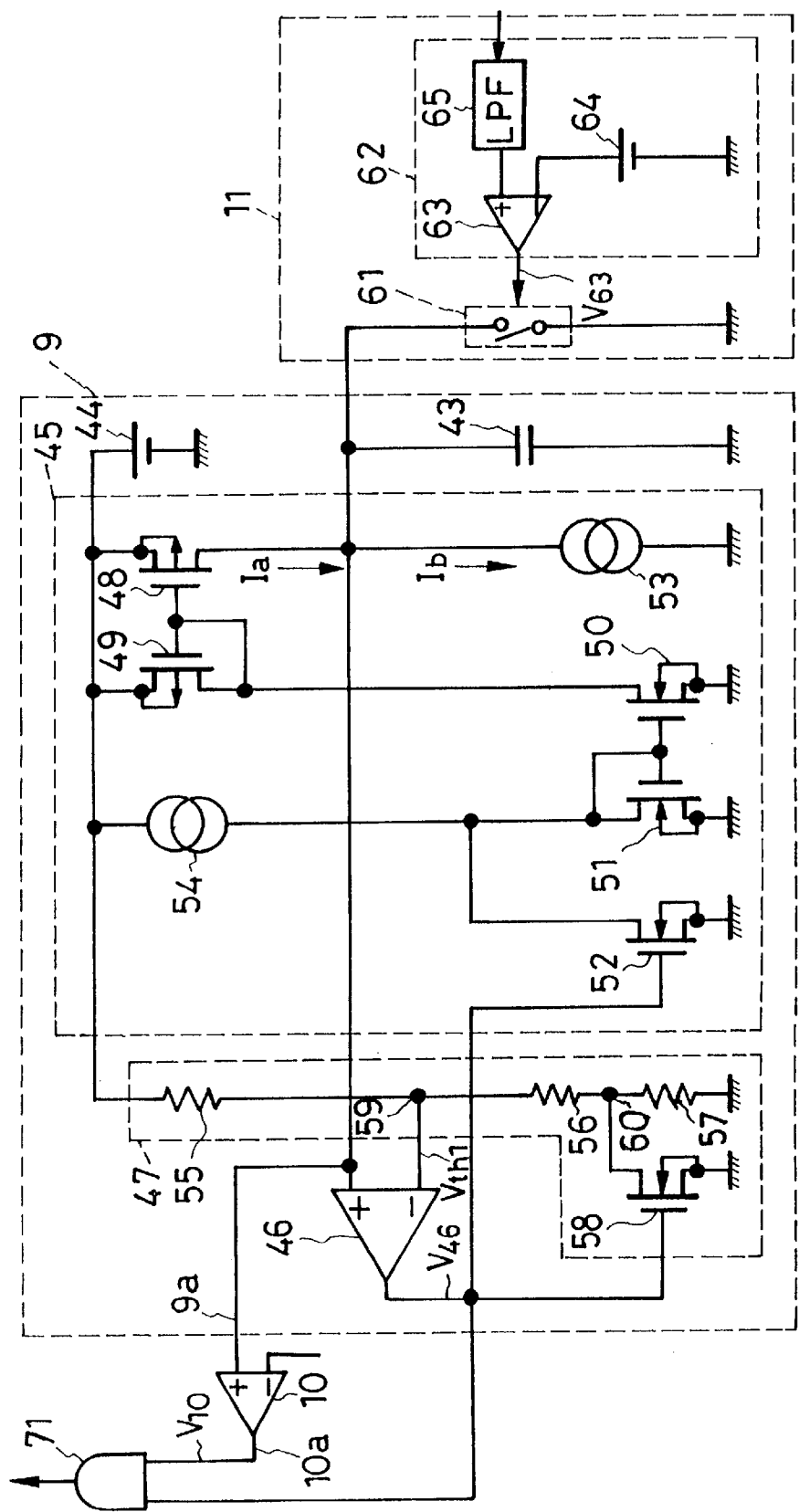
FIG. 7 is a schematic electrical diagram showing in more detail the sawtooth generator circuit and mode selector circuit of the FIG. 6 converter.
Figure 8:
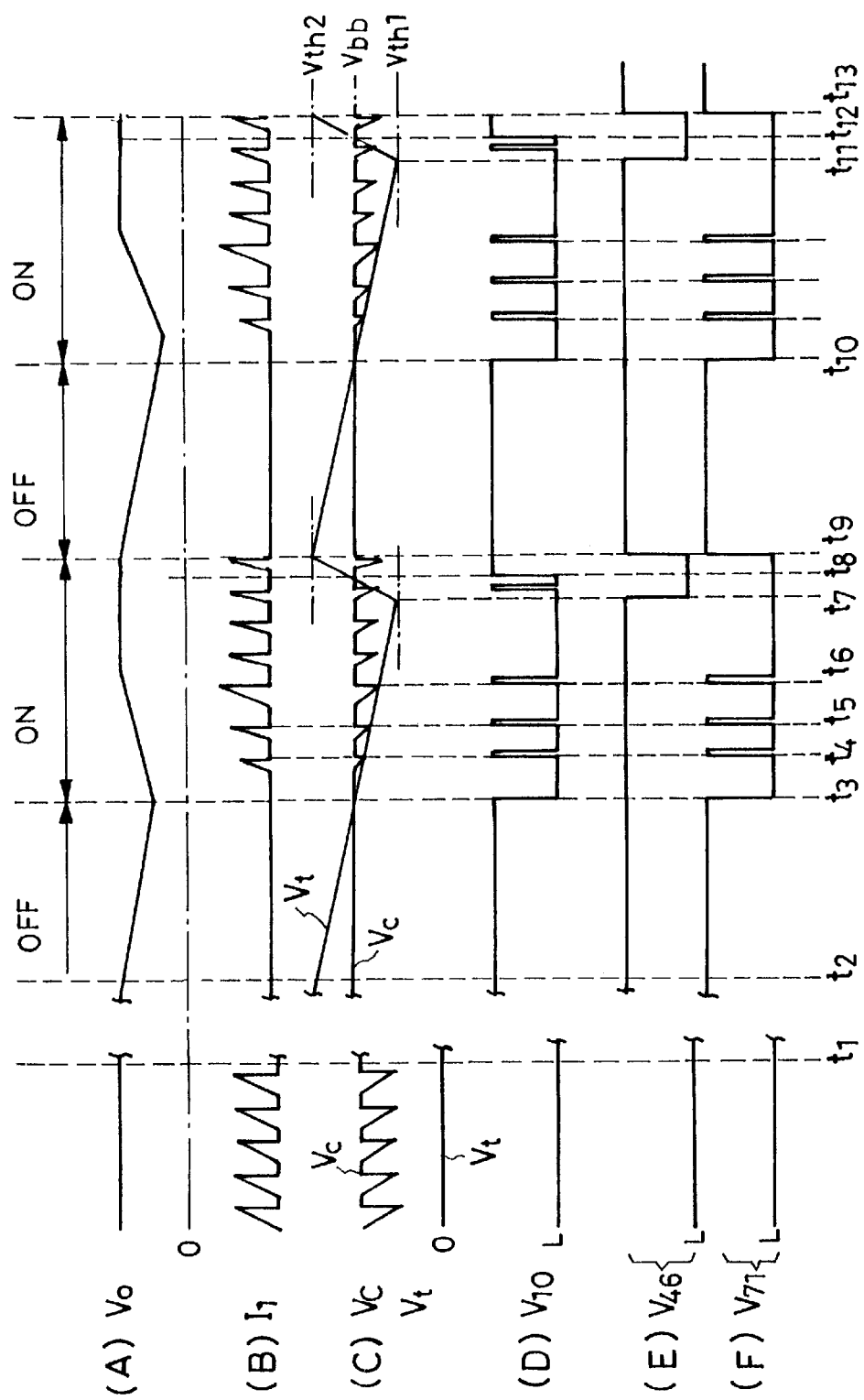
FIG. 8, consisting of (A) through (F), is a waveform diagram showing, in proper time relationship to one another, the waveforms appearing in various parts of FIGS. 6 and 7.

Embodiment of FIGS. 6–8

Shown in its entirety in FIG. 6, the second preferred form of d.c.-to-d.c. converter according to the invention is akin to the FIG. 1 embodiment except for the addition of an AND gate 71. As shown also in FIG. 7, the AND gate 71 has one input connected to the comparator 10, another input to the comparator 46 of the sawtooth generator circuit 9, and an output to the reset input R of the flip-flop 33, FIG. 2, of the switch control circuit 7 via the OR gate 35.

Reference may be had to FIG. 8 for the operation of the FIGS. 6 and 7 converter. As in the foregoing embodiment, the output voltage $V_{46}$ of the comparator 46 of the sawtooth generator circuit 9 changes as at (E) in FIG. 8, staying low during each rise of the FIG. 8 (C) sawtooth voltage $V_t$, as from $t_7$ to $t_9$. The resulting output voltage $V_{71}$ of the AND gate 71 is as depicted at (F) in FIG. 8, which waveform is equivalent to that of the FIG. 8 (D) output voltage $V_{10}$ of the comparator 10 except that the $t_7$–$t_9$ and $t_{11}$–$t_{13}$ parts of the FIG. 8 (D) waveform are made low. The switch 3 is therefore closed during the $t_3$–$t_9$ and $t_{10}$–$t_{13}$ periods, which are longer than the corresponding conducting periods of FIG. 5 by $t_8$–$t_9$ and $t_{12}$–$t_{13}$, respectively.

It will also be appreciated that the short-duration pulses included in the FIG. 8 (D) comparator output $V_{10}$, as during the $t_7$–$t_8$ and $t_{11}$–$t_{12}$ periods, are removed. The FIGS. 6 and 7 converter is similar to that of FIGS. 1–3 in all the other details of operation.

The FIGS. 6 and 7 converter gains the advantage, in addition to all those set forth in conjunction with that of FIGS. 1–3, greater operational stability toward the end of each conducting period of the switch 3. As will be understood by referring back to FIG. 5, the capacitor 43, FIG. 3, is charged as from $t_7$ to $t_9$. The conducting periods of the switch 3 may be lessened by the output from the comparator 10 in the course of this charging of the capacitor 43. If this lessening of the switch conducting periods takes place, the converter output voltage $V_0$ may drop, possibly causing the mode selector circuit 11 to produce a wrong output indicative of normal loading. The capacitor 43 will then be by passed, making it impossible to maintain intermittent converter operation.

No such mishap will occur in the FIGS. 6 and 7 converter. The output $V_{46}$, FIG. 8 (E), from the comparator 46 is directed into the AND gate 71, so that the conducting periods of the switch 3 are not limited by the sawtooth generator circuit 9 during the $t_7$–$t_9$ period. The switch 3 will stably maintain its intermittent operation, restricting a drop in the converter output voltage $V_0$ due to such operation.

Embodiment of FIGS. 9–12

Figure 9:
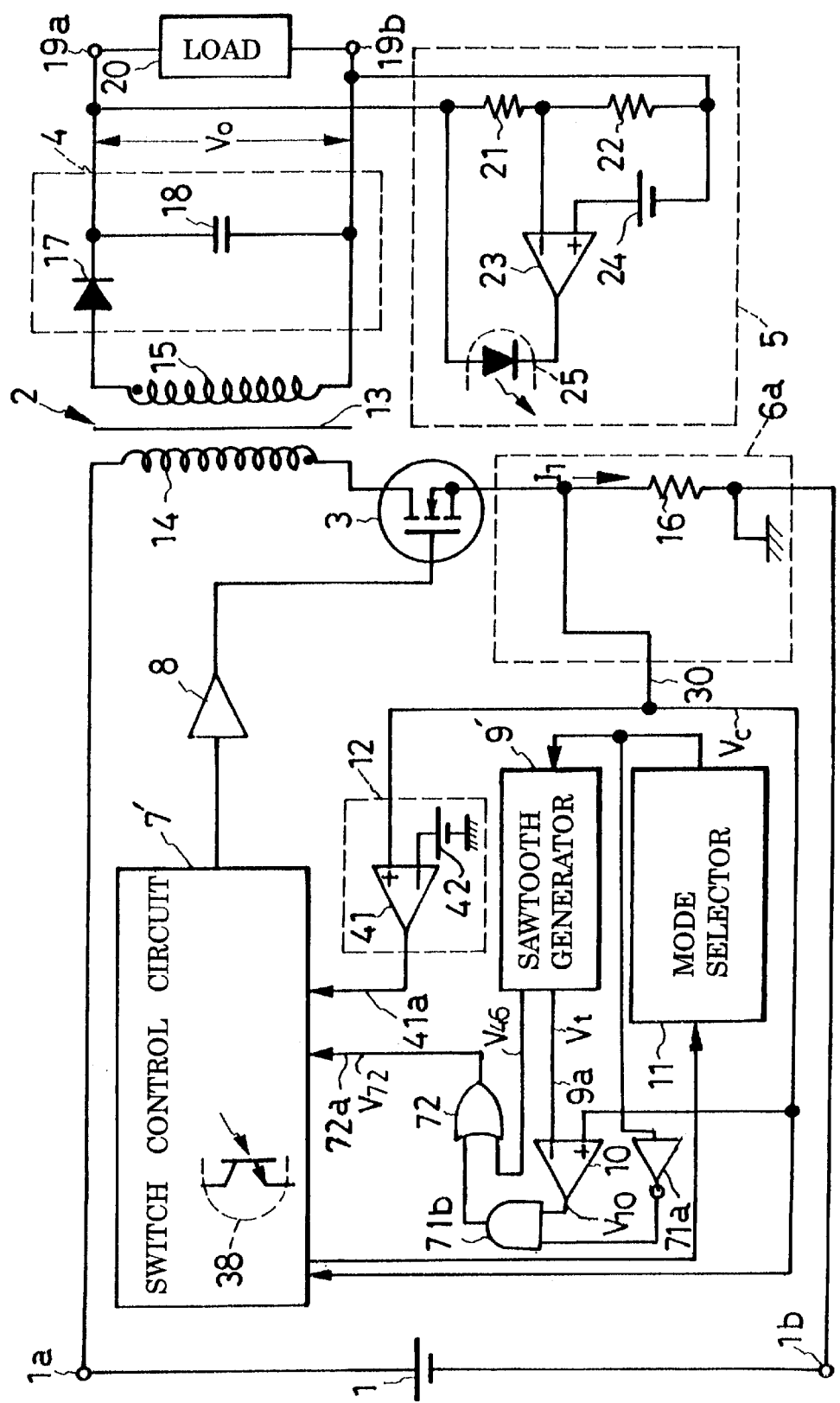
FIG. 9 is a diagram similar to FIG. 1 but showing a third preferred form of d.c.-to-d.c. converter according to the invention.
Figure 10:
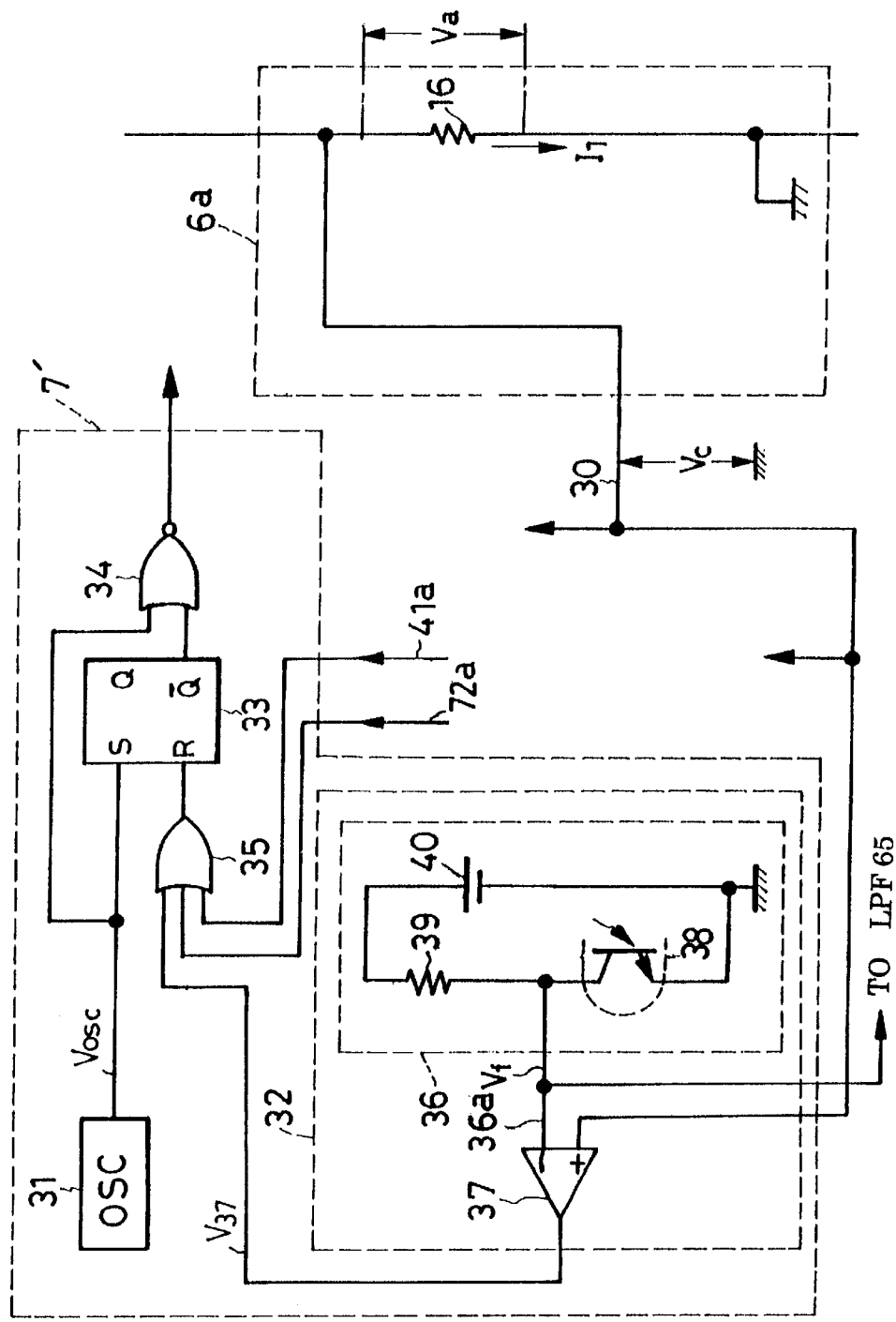
FIG. 10 is a schematic electrical diagram showing in more detail the current detector circuit and switch control circuit of the FIG. 9 converter.
Figure 11:
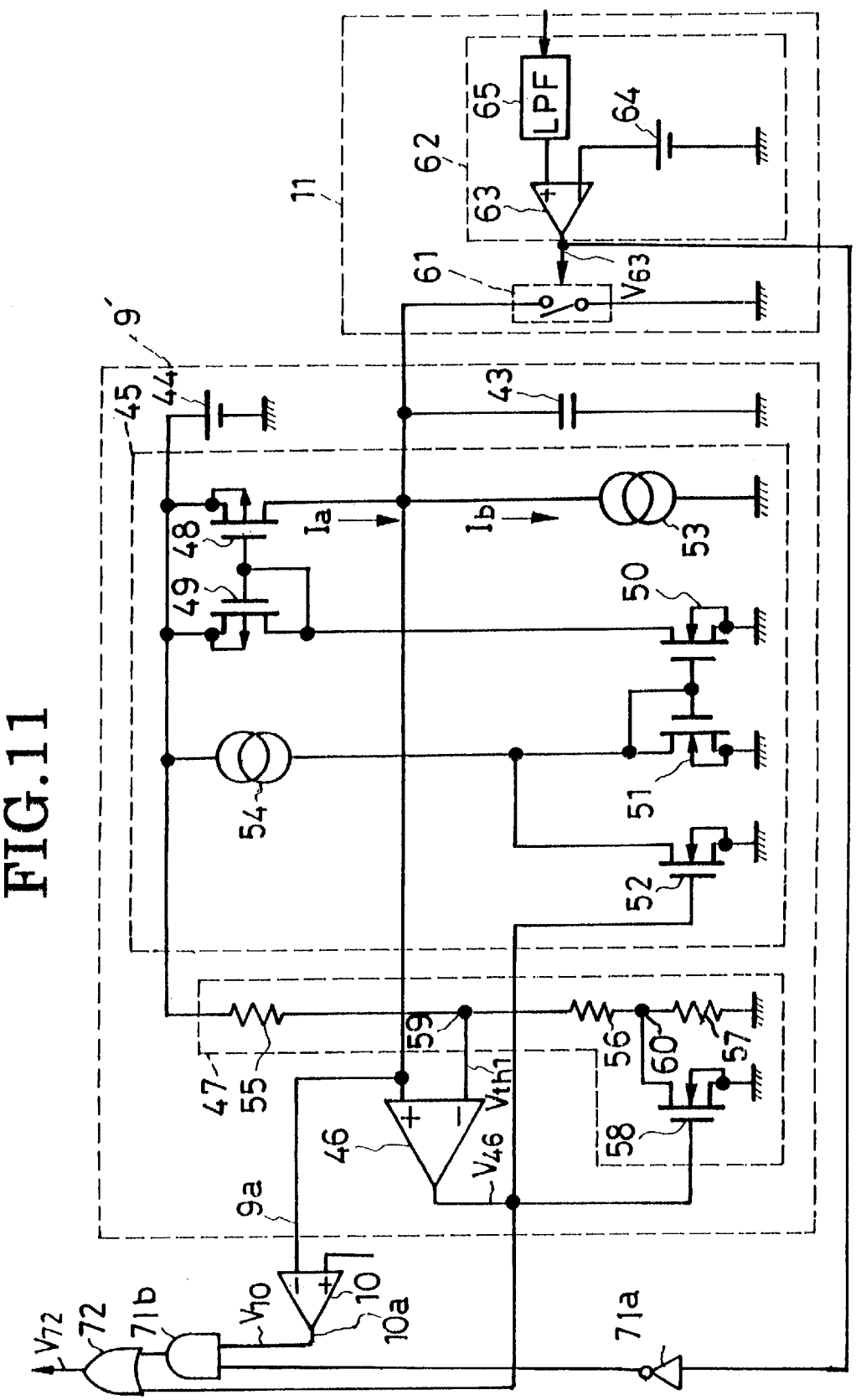
FIG. 11 is a schematic electrical diagram showing in more detail the sawtooth generator circuit and mode selector circuit of the FIG. 9 converter.

The third preferred form of d.c.-to-d.c. converter, shown in FIGS. 9–11, differs from that of FIGS. 1–3 in having a modified current detector circuit 6a, FIG. 9, a modified switch control circuit 7', FIG. 10, and a modified sawtooth generator circuit 9', FIG. 11, in that the connections of the positive and negative inputs of the comparators 10 and 41, both FIG. 9, are reversed from those in FIG. 1, and in additionally comprising a NOT circuit 71a, an AND gate 71b, and an OR gate 72 as in FIG. 9.

The modified current detector circuit 6a has only the resistor 16 connected between switch 3 and supply terminal 1b, which is grounded. Connected to the junction between switch 3 and resistor 16, the output line 30 of the current detector circuit 6a is connected both to the positive input of the comparator 10 and to the positive input of the comparator 41 of the overcurrent detector circuit 12. The negative input of the comparator 10 is connected to the output line 9a of the modified sawtooth generator circuit 9', and the negative input of the comparator 42 to the reference voltage source 42.

The OR gate 72, newly introduced in this embodiment, has one input connected to the comparator 10 via the AND gate 71b, and another input to the comparator 46, FIG. 11, of the sawtooth generator circuit 9'. The output of the OR gate 72 is connected by way of a line 72a to the reset input R of the RS flip-flop 33, FIG. 10, of the modified switch control circuit 77' via the OR gate 35. The AND gate 71b has one input connected to the comparator 10, and another input to the mode selector circuit 11 via the NOT circuit 71a.

A comparison of FIGS. 2 and 10 will reveal that the switch control circuits 7 and 7' illustrated therein are alike except for the polarities of the inputs of the comparator 37 and the placement of the phototransistor 38 and resistor 39 with respect to the polarity of the power supply 40.

A comparison of FIGS. 3 and 11 will prove, then, that the modified sawtooth generator circuit 9' is equivalent in hardware to the first disclosed circuit 9. However, the sawtooth generator circuit 9' has its circuit constants so altered as to appropriately determine the relative lengths of the conducting and the nonconducting periods of the switch, or the relative durations of the rising periods, as from $t_3$ to $t_9$ in FIG. 12, and falling periods, as from $t_9$ to $t_{10}$, of the sawtooth voltage $V_t$ at (C) in FIG. 12. It will be noticed from this figure that the rises and falls of the sawtooth voltage $V_t$ are of approximately the same duration. This sawtooth voltage might be called the triangular voltage as well.

Figure 12:
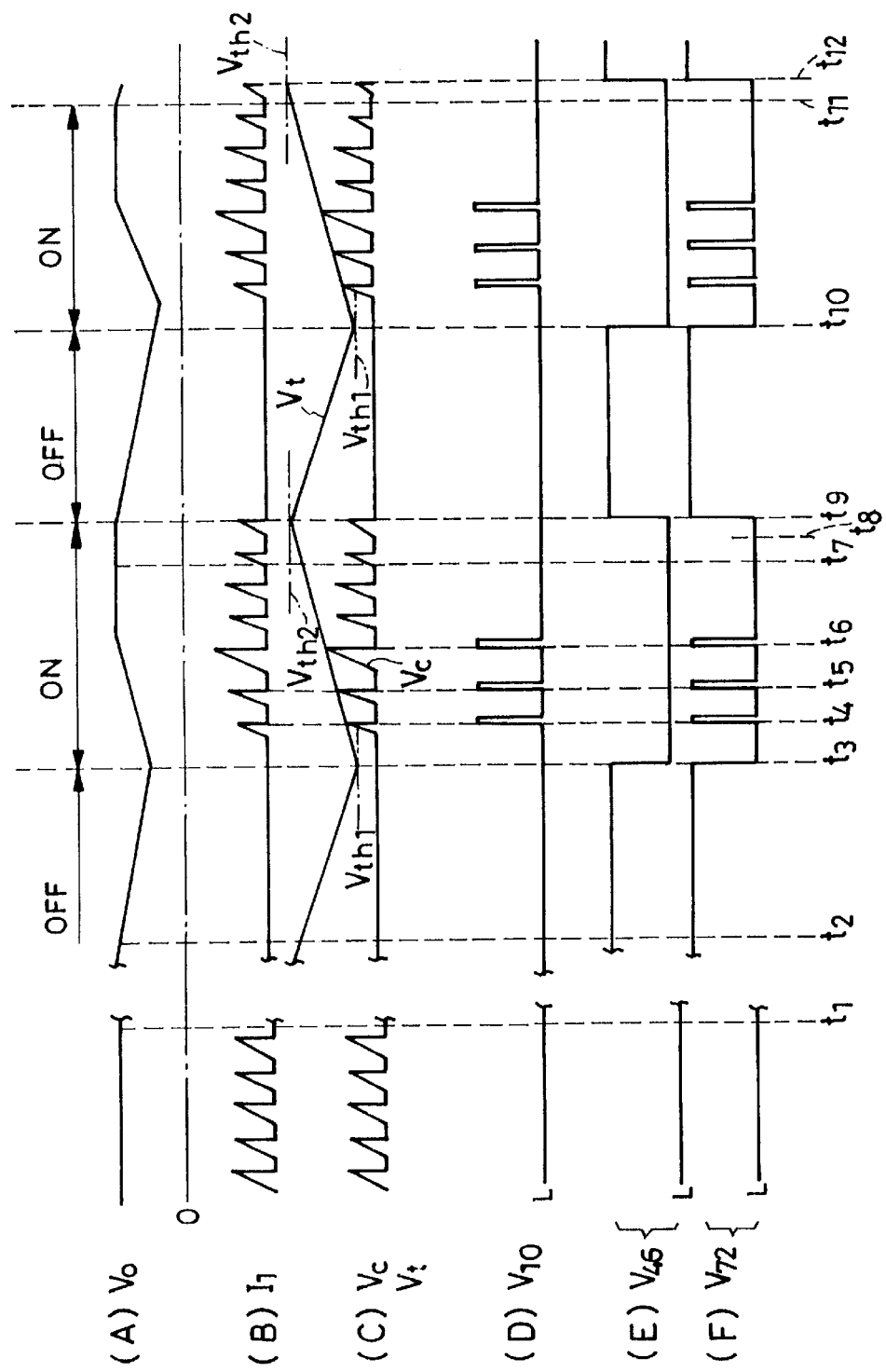
FIG. 12, consisting of (A) through (F), is a waveform diagram showing, in proper time relationship to one another, the waveforms appearing in various parts of FIGS. 9–11.

Since the switch current detector circuit 6 of the FIGS. 9–11 converter has no bias circuit, its output voltage $V_c$ is closely akin in waveform to the switch current $I_1$, as will be understood from (B) and (C) in FIG. 12. The sawtooth voltage $V_t$, FIG. 12 (C), is so shaped as to have rises, as from $t_3$ to $t_9$, during the conducting periods of the switch 3, and falls, as from $t_9$ to $t_{10}$, during the nonconducting periods of the switch. Whether the switch is conducting or nonconducting is ascertained from the output voltage $V_{46}$ of the comparator 46, FIG. 11, of the sawtooth generator circuit 9'. As indicated at (E) in FIG. 12, the comparator output voltage $V_{46}$ has its binary states determined by the ramps of the sawtooth voltage $V_t$.

Comparing the switch current detector output voltage $V_c$ and the rises of the sawtooth voltage $V_t$, both shown at (C) in FIG. 12, the comparator 10 provides the output $V_{10}$ given at (D) in FIG. 12. The short-duration pulses included in this comparator output $V_{10}$ as at $t_4$, $t_5$ and $t_6$ are equivalent to those seen at $t_4$, $t_5$, $t_6$ and so forth in FIGS. 5 and 8.

The comparator output $V_{10}$ is low during the nonconducting periods of the switch, as from $t_2$ to $t_3$, and from $t_9$ to $t_{10}$ in FIG. 12, in the course of the intermittent converter operation after $t_2$ and so is incapable of holding the flip-flop 33 reset. Therefore, as indicated in both FIGS. 9 and 11, the comparator output $V_{10}$, FIG. 12 (D), and the comparator output $V_{46}$, FIG. 12 (E), are both directed into the OR gate 72 thereby combined into the signal $V_{72}$ for application to the flip-flop 33.

The AND gate 71b, FIGS. 9 and 11, serves the purpose of blocking the output $V_{10}$ from the comparator 10 when the converter is under normal load. Since the comparator 63, FIG. 11, of the mode selector circuit 11 is high when the converter is normally loaded, the NOT circuit 71a is low, and so is the AND gate 71b, preventing the transmission of the comparator output $V_{10}$. The waveform of the output $V_{72}$ from the OR gate 72 seen at (F) in FIG. 12 is equivalent to the FIG. 8 (F) output $V_{71}$, from the AND gate 71, FIG. 7, of the FIGS. 6–7 converter.

The FIGS. 9–11 converter proves that it can offer the same advantages as do the foregoing embodiments, without necessarily biasing the voltage indicative of the switch current magnitude.

Figure 13:
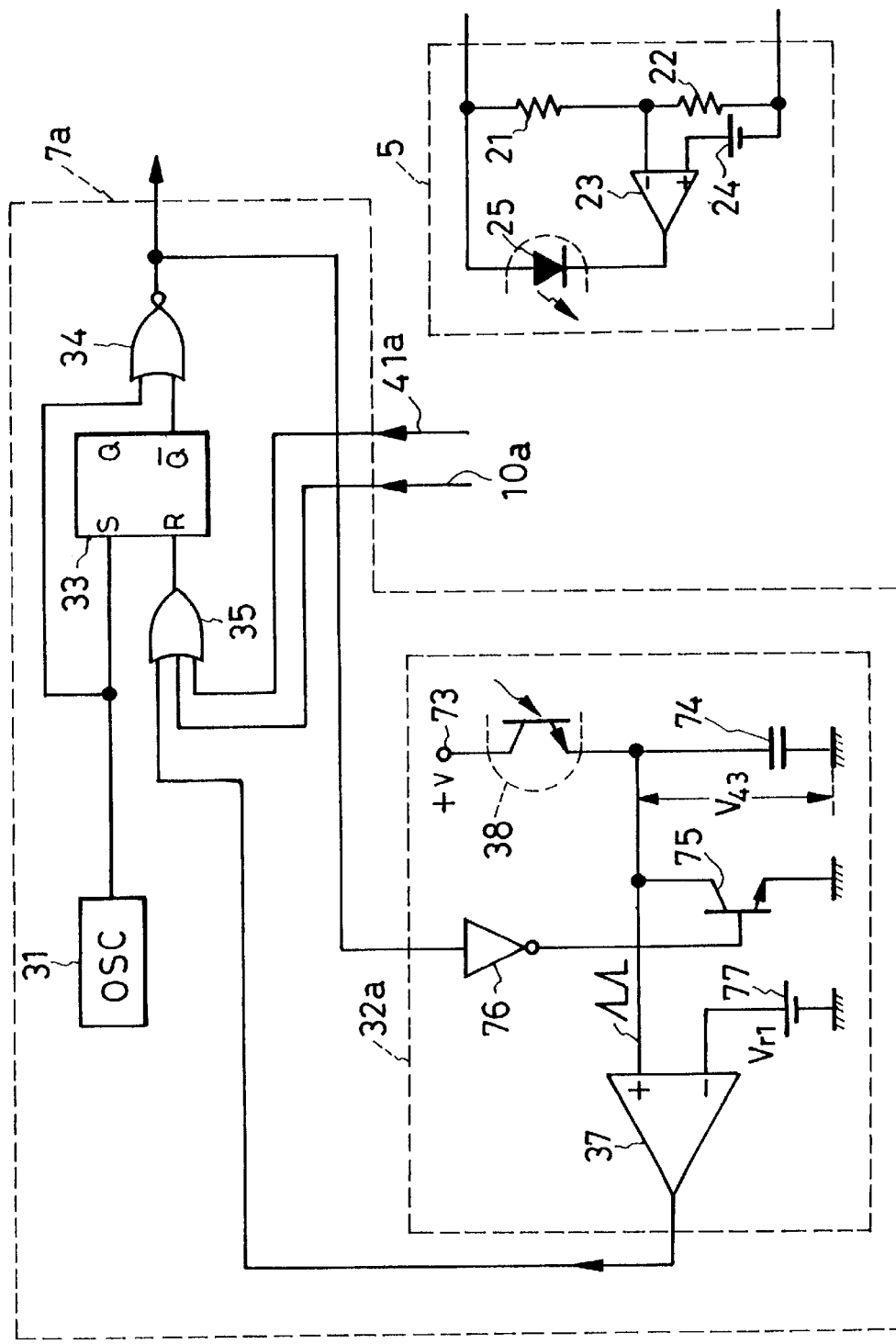
FIG. 13 is a schematic electrical diagram showing a modification of the switch control circuit of the FIG. 1 converter.
Figure 14:
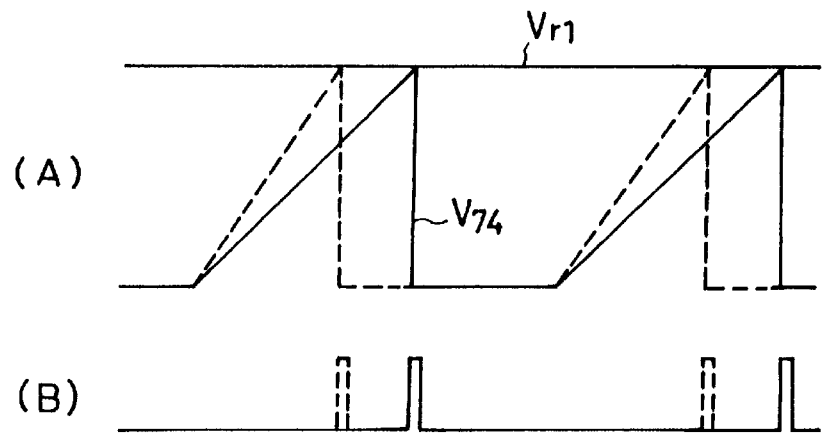
FIG. 14, consisting of (A) and (B), is a waveform diagram useful in explaining the operation of the FIG. 13 switch control circuit.

Embodiment of FIGS. 13–14

FIG. 13 shows another modified switch control circuit 7a for use in the FIG. 1 d.c.-to-d.c. converter in substitution for the switch control circuit 7. As will be understood from a comparison of this figure with FIG. 2, the latter being a detailed illustration of the FIG. 1 switch control circuit 7, the modified switch control circuit 7a differs from its FIG. 2 counterpart only in its conducting period determination circuit 32a. This circuit 32a relies on the output voltage detector circuit 5, rather than on the switch current detector circuit 6 as in FIG. 2, for terminating the conducting periods of the switch 3.

The modified conducting period determination circuit 32a includes the phototransistor 38 to be irradiated by the LED 25 of the output voltage detector circuit 5. The phototransistor 38 is connected in series with a capacitor 74 between supply terminal 73 and ground, so that the capacitor 74 is charged in proportion with the converter output voltage $V_o$. A switching transistor 75 is connected in parallel with the capacitor 74 for causing the latter to discharge. Having its base connected to the NOR gate 34 via a NOT circuit 76, the transistor 75 is conductive during the nonconduction of the switch 3 thereby preventing the capacitor 14 from being charged.

The comparator 37, included in the modified conducting period determination circuit 32a, has its positive input connected to the capacitor 74, and its negative input to a source 77 of a reference voltage $Vr_1$. Therefore, each time the voltage $V_{74}$ across the capacitor 74 rises to the reference voltage $Vr_1$, as at (A) in FIG. 14, the comparator 37 will put out a pulse as at (B) in this figure. The flip-flop 33 will be reset by each such comparator output pulse thereby terminating one conducting period of the switch 3. The rate at which the capacitor 74 is charged depends upon the converter output voltage $V_o$, and so does the length of time required for the voltage $V_{74}$ to rise to the level of the reference voltage $Vr_1$, as indicated by the broken lines in FIG. 14. It is thus seen that the conducting periods of the switch 3 are variable in step with the converter output voltage.

The teachings of FIG. 13 are applicable not only to the FIG. 1 converter but to all the other embodiments of the invention disclosed herein.

Figure 15:
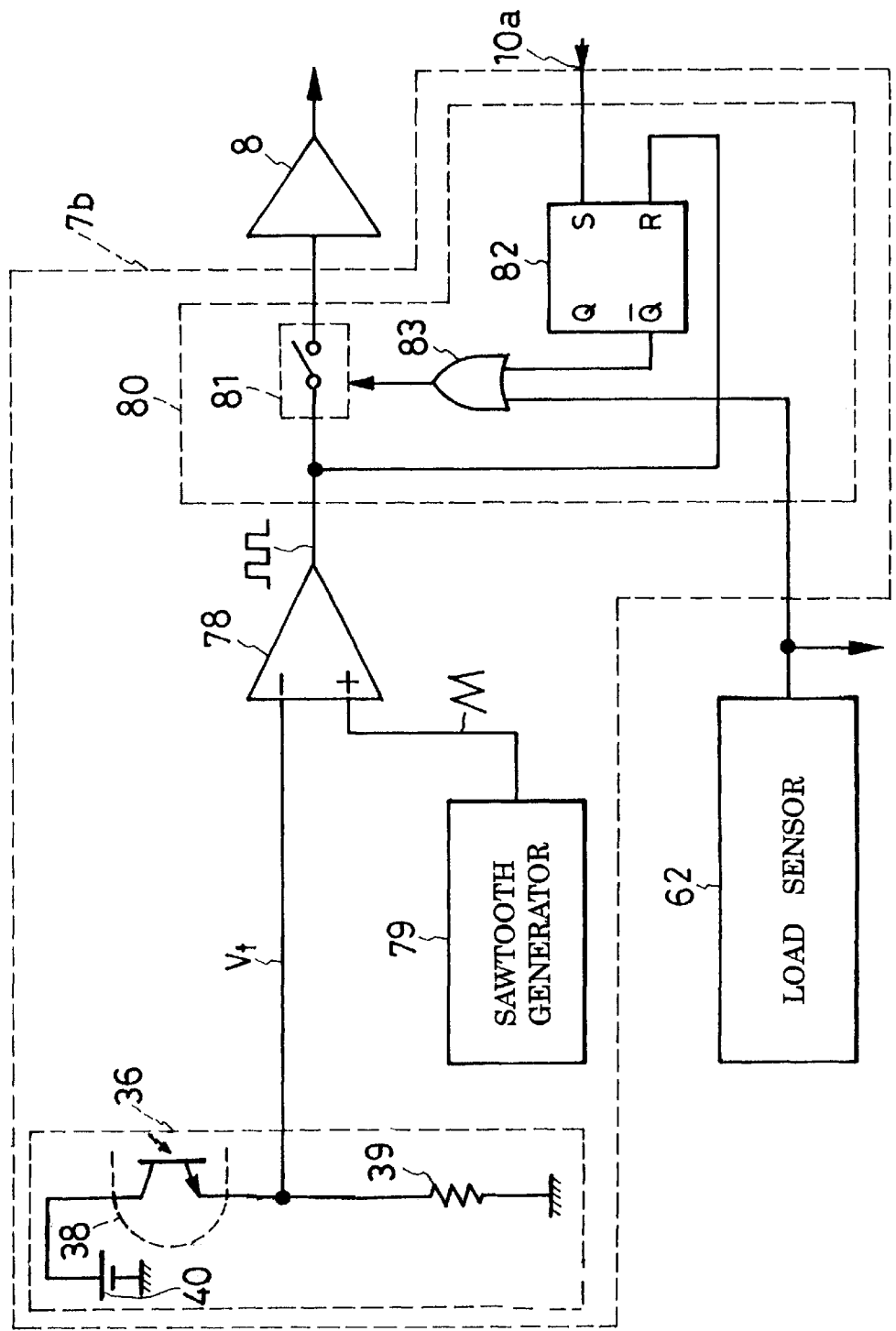
FIG. 15 is a schematic electrical diagram of another modification of the switch control circuit of the FIG. 1 converter.

Embodiment of FIG. 15

FIG. 15 shows still another modification 7b of the FIG. 2 switch control circuit 7. It includes the voltage feedback circuit 36 of the same design as that indicated by the same reference numeral in FIG. 2. The output of this circuit 36 is connected to the negative input of a comparator 78, to the positive input of which is connected a sawtooth generator 79. The output of this comparator 78 is connected to a circuit 80 for limitation of the conducting periods of the switch 3, FIG. 1, during intermittent converter operation. The conduction limitation circuit 80 has its output connected to the switch 3 via the amplifier 8.

The sawtooth generator 79 is of familiar make capable of generating a voltage of sawtooth or triangular waveform at the same frequency as the output from the pulse generator 31, FIG. 2. Comparing the output voltage $V_f$ of the voltage feedback circuit 36 and the sawtooth voltage from the sawtooth generator 79, the comparator 78 puts out a series of duration-modulated pulses.

The conduction limitation circuit 80 has a switch 81 inserted between comparator 78 and switch driver circuit 8 for modification of the switch control pulses. For on-off control of the switch 81 there is provided an OR gate 83 having a first input connected to the load sensor circuit 62, and a second input to a flip-flop 82. Constructed as shown in FIG. 3, the load sensor circuit 62 goes high when the converter is under normal load, and low when it is under light load. The switch 81 is therefore held closed as long as the converter is normally loaded, permitting the switch control pulses to pass on to the gate of the FET switch 3 via the driver circuit 8.

The flip-flop 82 has a set input S connected to the output line 10a of the comparator 10, FIG. 1, a reset input R connected to the comparator 78, and an inverting output connected to the OR gate 83. On being set by the FIG. 5 (D) output $V_{10}$ from the comparator 10 when the converter is under light load, the flip-flop 82 will cause the switch 81 to open, with the consequent interruption of the delivery of duration-modulated pulses. The flip-flop 82 will be reset by the next duration-modulated pulse from the comparator 78, standing by pending the arrival of the next pulse from the comparator 10.

Incorporating the FIG. 15 switch control circuit 7b, the converter of the otherwise FIGS. 1–3 construction will gain the same advantages as set forth for the first disclosed embodiment, as the limitation of the switching pulse durations occurs as in FIG. 5.

Figure 16:
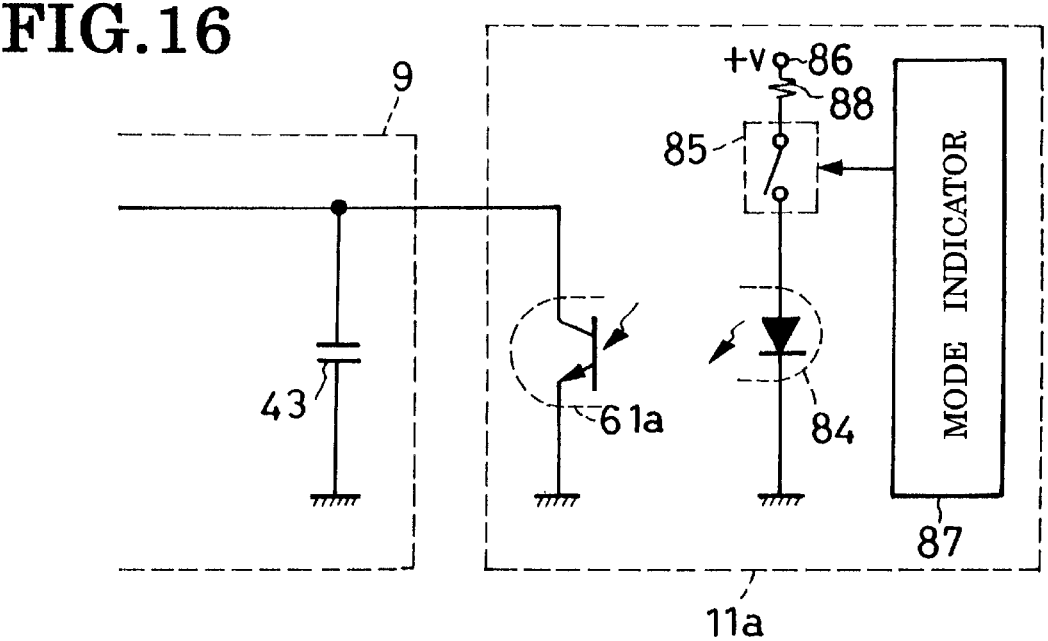
FIG. 16 is a schematic electrical diagram of a modification of the mode selector circuit of the FIG. 1 converter.

Embodiment of FIG. 16

The mode selector circuit 11, shown in detail in FIG. 3, of the FIG. 1 converter is modifiable as seen at 11a in FIG. 16. The modified mode selector circuit 11a includes a phototransistor 61a which, as will become better understood as the description proceeds, performs the same functions as does the switch 61, FIG. 3, of the first disclosed mode selector circuit 11. The phototransistor 61a is therefore connected in parallel with the capacitor 43 of the sawtooth generator circuit 9. Optically coupled to the phototransistor 61a, an LED 84 is connected between supply terminal 86 and ground via a serial circuit of a switch 85 and resistor 88. The mode selector circuit 11a further includes a mode indicator circuit 87 which, like the load sensor circuit 62, FIG. 3, of the first disclosed mode selector circuit 11, is capable of ascertaining the load conditions of the converter. The mode indicator circuit 87 is connected to the switch 85 for opening the same when the converter is under light load, and for closing the same when the converter is under normal load.

Thus the modified mode selector circuit 11a functions just like its FIG. 3 counterpart 11, contributing to the production of the sawtooth voltage Vt by causing the capacitor 43 to be charged and discharged.

Figure 17:
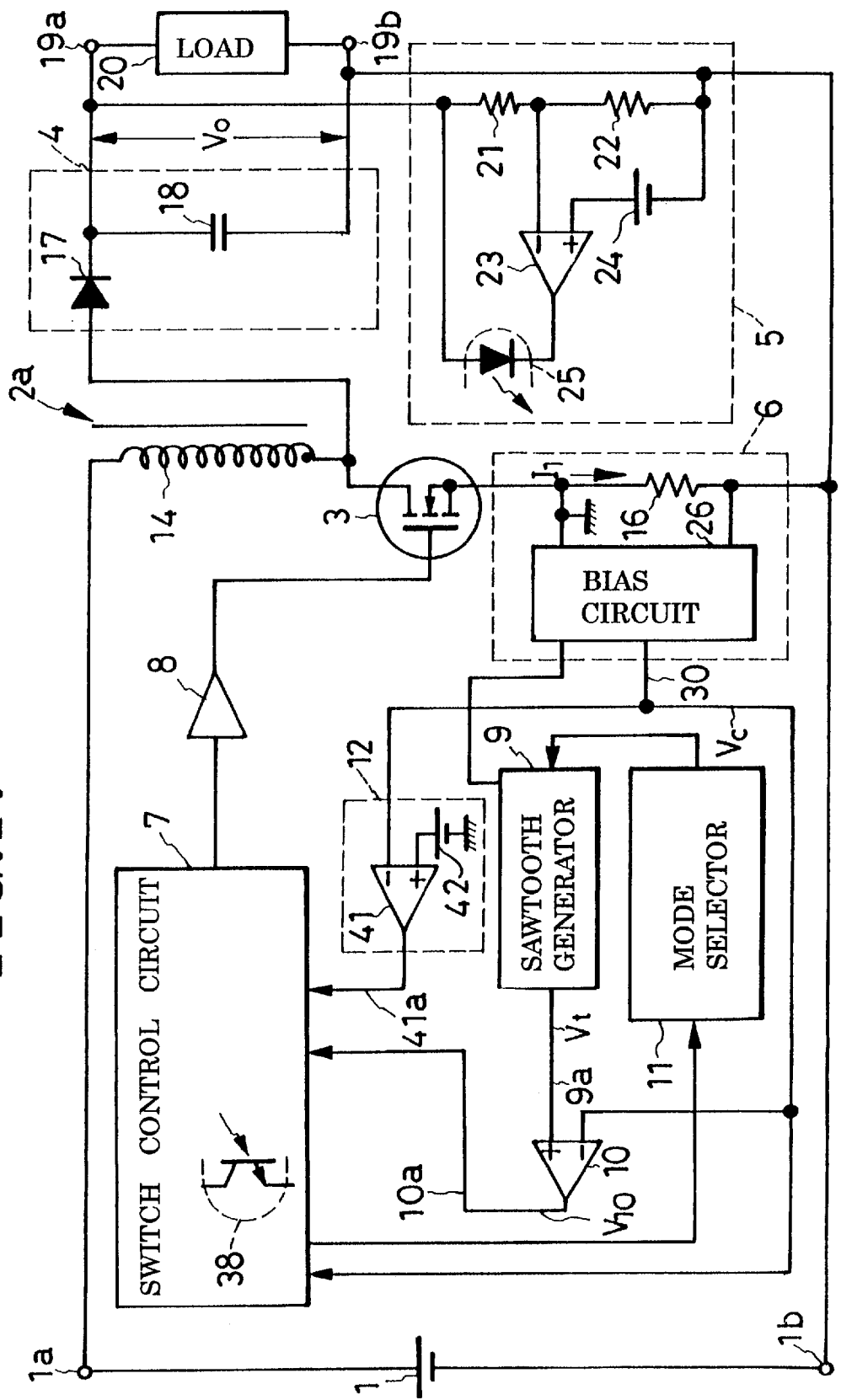
FIG. 17 is a diagram similar to FIG. 1 but showing a further preferred form of d.c.-to-d.c. converter according to the invention.

Embodiment of FIG. 17

The d.c.-to-d.c. converter of FIG. 17 features a reactor 2a connected in place of the transformer 2 of the FIG. 1 converter, without an equivalence of the transformer secondary 15. Another difference is that the rectifying and smoothing circuit 4 is connected in parallel with the switch 3 and the resistor 16 of the switch current detector circuit 6. This FIG. 17 converter is similar to that of FIG. 1 in all the other details of construction.

The energy that has been stored on the reactor winding 14 during each conducting period of the switch 3 will be supplied to the load 20 when the switch is opened. This is because the rectifying diode 17 is reverse-biased during the conduction of the switch 3, causing energy storage on the reactor 2a, and forward-biased when the switch is opened, causing the reactor to liberate the stored energy. The capacitor 18 will be charged by the resultant of the voltage across the power supply 1 and that across the reactor winding 14. In short the FIG. 17 converter functions as a step-up switching regulator.

Figure 18:
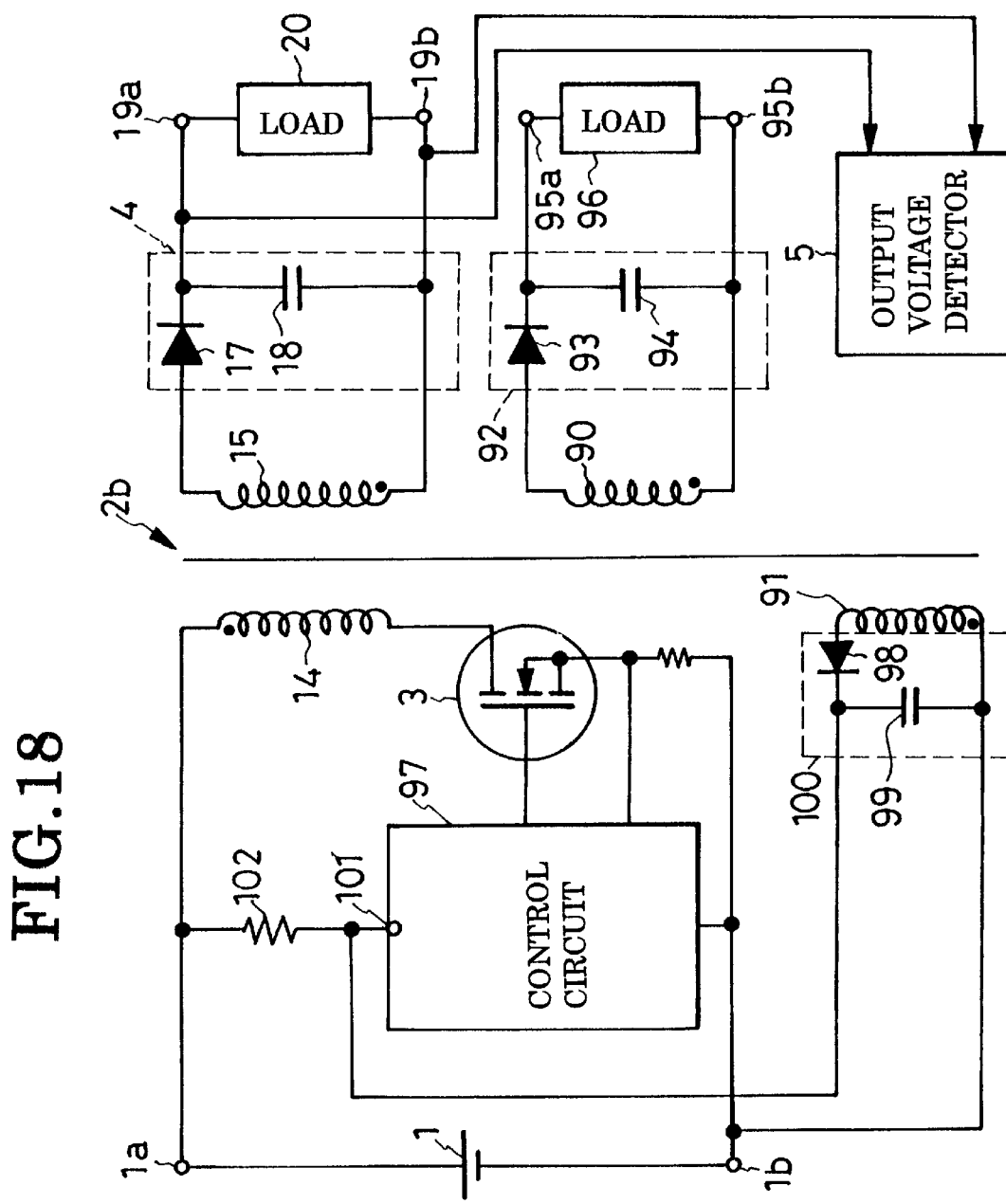
FIG. 18 is a diagram somewhat similar to FIG. 1 but showing a still further preferred form of d.c.-to-d.c. converter according to the invention.

Embodiment of FIG. 18

FIG. 18 shows a further preferred form of d.c.-to-d.c. converter according to the invention, which includes a transformer 2b having a tertiary winding 90 and a quaternary winding 91 in addition to the primary winding 14 and the secondary winding 15. The four transformer windings are all conventionally electromagnetically coupled together. The transformer tertiary 90 has its pair of opposite extremities connected to a second rectifying and smoothing circuit 92 and thence to a second pair of converter output terminals 95a and 95b. The second rectifying smoothing circuit 92 is similar in construction to the first such circuit 4, comprising a diode 93 and a capacitor 94.

Between the second pair of converter output terminals 95a and 95b is shown connected a second load 96 which makes much less power requirement than does the first load 20. Both loads 20 and 96 are to be powered in Normal Mode, and only the second load 96 in Standby Mode.

The control circuit 97 shown included in the FIG. 18 converter should be interpreted as a combination of the switch control circuit 7, sawtooth generator circuit 9, comparator 10, and mode selector circuit 11 of the FIG. 1 converter. A third rectifying and smoothing circuit 100, comprising a diode 98 and capacitor 99, is connected across the converter quaternary 91 for powering the control circuit 97. The supply terminal 101 of the control circuit 97 is connected to the fourth rectifying and smoothing circuit 100 and, via a starting resistor 102, to the power supply 1. Being equivalent to the FIG. 1 converter in the details of the control circuit 97, the FIG. 18 converter offers the advantages similar to those set forth with the first disclosed embodiment.

Possible Modifications

Although the d.c.-to-d.c. converter according to the present invention has been shown and described in terms of several preferred forms thereof, it is not desired that the invention be limited by the exact details of such preferred forms. The following, then, is a brief list of possible modifications, alterations, and adaptations of the illustrated embodiments which are all believed to fall within the scope of the invention:

1. The invention could be applied to a known forward d.c.-to-d.c. converter such that the transformer secondary 15 has its polarity so determined as to cause conduction through the diode 17 of the rectifying and smoothing circuit 4 during the conducting periods of the switch 3.
2. The recurrence rate of the pulse generator could be made variable according to the power requirement of the load or the voltage of the power supply.
3. The sawtooth generator circuit 9 or 9' could be replaced by a circuit capable of generating other periodic voltage waveforms such as triangular, sinusoidal, or trapezoidal.
4. The output voltage $V_o$ could be detected not from the rectifying and smoothing circuit 4 but from, for example, the third rectifying and smoothing circuit 100, FIG. 18, connected to the transformer quaternary 91, the output voltage of the third rectifying and smoothing circuit being indicative of the converter output voltage.
5. The FET switches 3, 48–52, and 58 could be replaced by other types of semiconductor switches such as bipolar transistors, IGBTs, and sense MOSFETs.
6. The output voltage detector circuit 5 and the switch control circuit 7 could be coupled together electrically rather than optically.
7. A known resonance circuit might be added for reduction of switching losses by the switch 3.
8. The switch current could be detected magnetoelectrically, as by a Hall-effect device, instead of by the circuit 6 or 6a.
9. The mode selector circuit 11 will be unnecessary if the converter is known to operate under light load only, the converter being then constantly put to intermittent operation.

What is claimed is:

1. A d.c.-to-d.c. converter to be connected between a d.c. power supply and a load, comprising:
    (a) a pair of input terminals to be connected to a d.c. power supply for inputting a unidirectional voltage;
    (b) a switch connected between the pair of input terminals in order to be repeatedly turned on and off by a series of switching pulses of variable durations having a period ($T_l$);
    (c) inductance means connected in series with the switch;
    (d) a rectifying and smoothing circuit connected to the inductance means for providing an output voltage ($V_o$) to be applied to the load;
    (e) an output voltage detector circuit for detecting the output voltage ($V_o$) of the converter;
    (f) a switch current detector circuit for putting out a voltage ($V_c$) indicative of the magnitude of a current ($I_l$) flowing through the switch;
    (g) a periodic wave generator circuit for generating a periodic voltage ($V_t$) in the form of a series of alternations of a rise and a fall, with a period that is a plurality of times longer than the period ($T_l$) of the switching pulses, the periodic voltage ($V_t$) crossing the switch current detector output voltage ($V_c$) during its rises and falls;
    (h) a comparator having an input connected to the switch current detector circuit, and another input connected to the periodic wave generator circuit, for providing an output ($V_{10}$) that changes from one state to another depending upon the relative magnitudes of the switch current detector output voltage ($V_c$) and the periodic voltage ($V_t$); and
    (i) a switch control circuit having an output connected to the switch for delivering the switching pulses thereto, an input connected to the output voltage detector circuit for controlling the durations of the switching pulses according to the converter output voltage ($V_o$) so as to keep the same constant, and another input connected to the comparator for permitting or preventing the delivery of the switching pulses to the switch depending upon the binary output ($V_{10}$) from the comparator.

2. The d.c.-to-d.c. converter of claim 1 wherein the switch current detector circuit comprises:
    (a) a current-detecting resistor having a first extremity connected to the switch, and a second extremity connected to one of the input terminals of the converter, the first extremity of the current-detecting resistor being grounded;
    (b) a bias power supply; and
    (c) a pair of voltage-dividing resistors connected in series with each other and, via the bias power supply, in parallel with the current-detecting resistor;
    (d) whereby the voltage ($V_c$) indicative of the magnitude of the current flowing through the switch is obtained from between a junction between the pair of voltage-dividing resistors and the ground.

3. The d.c.-to-d.c. converter of claim 1 wherein the periodic wave generator circuit comprises:
    (a) a capacitor;
    (b) a charge/discharge circuit for causing the capacitor to be charged and discharged;
    (c) a variable reference voltage source capable of selectively providing a first ($V_{th1}$) and a second ($V_{th2}$) reference voltage, the first reference voltage being less than the second reference voltage; and
    (d) a second comparator having an input connected to the capacitor, another input connected to the variable reference voltage source, and an output connected to the variable reference voltage source, for causing the variable reference voltage source to switch from the first ($V_{th1}$) to the second ($V_{th2}$) reference voltage when a voltage across the capacitor drops to the first reference voltage, and from the second to the first reference voltage when the voltage across the capacitor rises to the second reference voltage, the output of the second comparator being additionally connected to the charge/discharge circuit for causing the same to charge the capacitor when the second comparator is in one state, and to discharge the capacitor when the second comparator is in another state.

4. The d.c.-to-d.c. converter of claim 3 further comprising:
   (a) first circuit means connected to the periodic wave generator circuit for providing a signal indicative of the rises of the periodic voltage ($V_t$); and
   (b) second circuit means connected between the first circuit means and the switch control circuit for permitting the delivery of the switching pulses to the switch during the rises of the periodic voltage ($V_t$).

5. The d.c.-to-d.c. converter of claim 4 wherein the first circuit means is connected to the output of the second comparator of the periodic wave generator circuit.

6. The d.c.-to-d.c. converter of claim 5 wherein the second circuit means comprises a gate circuit having inputs connected to the first recited comparator and the first circuit means.

7. The d.c.-to-d.c. converter of claim 1 wherein the switch control circuit comprises:
   (a) a pulse generator for providing a series of pulses at a repetition frequency for on-off control of the switch;
   (b) a voltage feedback circuit coupled to the output voltage detector circuit for providing a voltage feedback signal ($V_f$) indicative of the converter output voltage ($V_o$);
   (c) a second comparator having an input connected to the voltage feedback circuit, and another input connected to the switch current detector circuit, for providing an output that changes from one state to another when the switch current detector output voltage ($V_c$) agrees with the voltage feedback signal ($V_f$);
   (d) a flip-flop having an input connected to the pulse generator, and another input connected to the second comparator of the switch control circuit, for providing an output that changes from a first to a second state in response to each output pulse of the pulse generator and that changes from the second to the first state upon agreement of the switch current detector output voltage ($V_c$) with the voltage feedback signal ($V_f$);
   (e) a logic circuit having an input connected to the pulse generator, another input connected to the flip-flop, and an output connected to the switch, for delivering the switching pulses to the switch in order to cause conduction therethrough when the output from the flip-flop is in the second state and, at the same time, when no pulses are being put out by the pulse generator; and
   (f) the first recited comparator being connected to the flip-flop for resetting the same.

8. The d.c.-to-d.c. converter of claim 1 further comprising a mode selector circuit for providing a signal indicative of whether the converter is under normal or light load, the mode selector circuit being connected to the periodic wave generator circuit for permitting the same to generate the periodic voltage ($V_t$) only when the converter is lightly loaded.

9. The d.c.-to-d.c. converter of claim 1 wherein the inductance means comprises a transformer having a primary winding connected to the switch, and a secondary winding connected to the rectifying and smoothing circuit.

10. A d.c.-to-d.c. converter to be connected between a d.c. power supply and a load, comprising:
    (a) a pair of input terminals to be connected to a d.c. power supply for inputting a unidirectional voltage;
    (b) a switch connected between the pair of input terminals in order to be repeatedly turned on and off by a series of switching pulses of variable durations having a period ($T_t$);
    (c) inductance means connected in series with the switch;
    (d) a rectifying and smoothing circuit connected to the inductance means for providing an output voltage ($V_o$) to be applied to the load;
    (e) an output voltage detector circuit for providing a voltage feedback signal (Vf) indicative of the output voltage ($V_o$) of the converter;
    (f) a switch current detector circuit for putting out a voltage ($V_c$) indicative of the magnitude of a current ($I_t$) flowing through the switch;
    (g) a periodic wave generator circuit for generating a periodic voltage ($V_t$) in the form of a series of alternations of a first and a second ramp which are oriented in opposite directions, with a period that is a plurality of times longer than the period ($T_t$) of the switching pulses, the periodic voltage ($V_t$) being of such magnitude that the first ramp thereof is partly traversed by the switch current detector output voltage ($V_c$) when the switch is turned on;
    (h) a comparator having an input connected to the switch current detector circuit, and another input connected to the periodic wave generator circuit, for producing pulses ($V_{10}$) for limiting the conducting periods of the switch depending upon the relative magnitudes of the switch current detector output voltage ($V_c$) and the periodic voltage ($V_t$);
    (i) binary circuit means for providing a binary output having either of two possible states indicative of the first and the second ramps of the periodic voltage ($V_t$); and
    (j) a switch control circuit connected between the output voltage detector circuit and the switch for delivering to the latter the switching pulses of durations controlled according to the converter output voltage ($V_O$), in order to keep constant the converter output voltage, the switch control circuit having inputs connected to the comparator and the binary circuit means for preventing the delivery of the switching pulses to the switch both when the binary output is in a prescribed one of the two possible states and when the comparator is producing the pulses ($V_{10}$).

11. The d.c.-to-d.c. converter of claim 10 wherein the periodic wave generator circuit comprises:
    (a) a capacitor;
    (b) a charge/discharge circuit for causing the capacitor to be charged and discharged;
    (c) a variable reference voltage source capable of selectively providing a first ($V_{th1}$) and a second ($V_{th2}$) reference voltage, the first reference voltage being less than the second reference voltage; and
    (d) a second comparator having an input connected to the capacitor, another input connected to the variable reference voltage source, and an output connected to the variable reference voltage source, for causing the variable reference voltage source to switch from the first ($V_{th1}$) to the second ($V_{th2}$) reference voltage when a voltage across the capacitor drops to the first reference voltage, and from the second to the first reference voltage when the voltage across the capacitor rises to the second reference voltage, the output of the second comparator being additionally connected to the charge/discharge circuit for causing the same to charge the capacitor when the second comparator is in one state, and to discharge the capacitor when the second comparator is in another state.

12. The d.c.-to-d.c. converter of claim 11 wherein the binary circuit means is connected to the second comparator of the periodic wave generator circuit for providing the binary output.

13. A d.c.-to-d.c. converter to be connected between a d.c. power supply and a load, comprising:

(a) a pair of input terminals to be connected to a d.c. power supply for inputting a unidirectional voltage;

(b) a first pair of output terminals to be connected to a first load;

(c) a second pair of output terminals to be connected to a second load;

(d) a transformer having a primary winding connected between the pair of input terminals, a secondary winding connected between the first pair of output terminals, and a tertiary winding connected between the second pair of output terminals;

(e) a switch connected between the pair of input terminals and in series with the transformer primary in order to be repeatedly turned on and off by a series of switching pulses of variable durations having a period $(T_t)$;

(f) a first rectifying and smoothing circuit connected between the transformer secondary and the first pair of output terminals for providing a first output voltage $(V_o)$ to be applied to the first load;

(g) a second rectifying and smoothing circuit connected between the transformer tertiary and the second pair of output terminals for providing a second output voltage to be applied to the second load;

(h) an output voltage detector circuit connected to the first rectifying and smoothing circuit for detecting the first output voltage $(V_o)$;

(i) a switch current detector circuit for putting out a voltage $(V_c)$ indicative of the magnitude of a current $(I_t)$ flowing through the switch;

(j) a periodic wave generator circuit for generating a periodic voltage $(V_t)$ in the form a series of alternations of a rise and a fall, with a period that is a plurality of times longer than the period $(T_t)$ of the switching pulses, the periodic voltage $(V_t)$ crossing the switch current detector output voltage $(V_c)$ during its rises and falls;

(k) a comparator having an input connected to the switch current detector circuit, and another input connected to the periodic wave generator circuit, for providing an output $(V_{10})$ that changes from one state to another depending upon the relative magnitudes of the switch current detector output voltage $(V_c)$ and the periodic voltage $(V_t)$; and (l) a switch control circuit having an output connected to the switch for delivering the switching pulses thereto, an input connected to the output voltage detector circuit for controlling the durations of the switching pulses according to the first output voltage $(V_o)$ so as to keep the same constant, and another input connected to the comparator for permitting or preventing the delivery of the switching pulses to the switch depending upon the binary output $(V_{10})$ from the comparator.

14. The d.c.-to-d.c. converter of claim 13 further comprising:

(a) a quaternary winding of the transformer; and (b) a third rectifying and smoothing circuit connected to the transformer quaternary for powering the periodic wave generator circuit and the switch control circuit.

* * * * *